(12) United States Patent
Song et al.

(10) Patent No.: US 9,958,735 B2
(45) Date of Patent: May 1, 2018

(54) LIQUID CRYSTAL DISPLAY AND MANUFACTURING METHOD THEREOF

(71) Applicant: SAMSUNG DISPLAY CO., LTD., Yongin-si, Gyeonggi-do (KR)

(72) Inventors: Dae Ho Song, Hwaseong-si (KR); Jung Hyun Kwon, Seoul (KR); Kwang Keun Lee, Osan-si (KR); You Young Jin, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days. days.

(21) Appl. No.: 15/257,832

(22) Filed: Sep. 6, 2016

(65) Prior Publication Data

US 2017/0090243 A1 Mar. 30, 2017

(30) Foreign Application Priority Data

Sep. 25, 2015 (KR) .......................... 10-2015-0136119

(51) Int. Cl.
| | | |
|---|---|---|
| G02F 1/1339 | (2006.01) | |
| G02F 1/1341 | (2006.01) | |
| G02F 1/1333 | (2006.01) | |
| G02F 1/1335 | (2006.01) | |

(52) U.S. Cl.
CPC ...... *G02F 1/1341* (2013.01); *G02F 1/133377* (2013.01); *G02F 1/133617* (2013.01); *G02F 1/133345* (2013.01); *G02F 1/133514* (2013.01); *G02F 2001/133562* (2013.01)

(58) Field of Classification Search
CPC ............. G02F 1/1341; G02F 1/133617; G02F 1/133377; G02F 2001/133562; G02F 1/133345; G02F 1/133514
See application file for complete search history.

(56) References Cited

U.S. PATENT DOCUMENTS

| | | | |
|---|---|---|---|
| 7,750,984 B2 | 7/2010 | Ha et al. | |
| 2001/0038426 A1* | 11/2001 | Bechtel ............. | G02F 1/133617 349/71 |
| 2008/0212305 A1* | 9/2008 | Kawana ............. | C09B 67/0033 362/84 |
| 2014/0036538 A1* | 2/2014 | You .................... | G09F 13/0409 362/613 |
| 2014/0192302 A1* | 7/2014 | Kim .................... | G02F 1/1341 349/106 |

(Continued)

FOREIGN PATENT DOCUMENTS

| | | |
|---|---|---|
| JP | 2008-033117 A | 2/2008 |
| JP | 2008-242031 A | 10/2008 |

(Continued)

*Primary Examiner* — Donald Raleigh
(74) *Attorney, Agent, or Firm* — Innovation Counsel LLP

(57) ABSTRACT

A liquid crystal display according to an exemplary embodiment of the inventive concept includes a substrate; a thin film transistor positioned on the substrate; a pixel electrode connected to the thin film transistor; a roof layer positioned to face the pixel electrode; a liquid crystal layer positioned between the pixel electrode and the roof layer within a plurality of microcavities; a capping layer positioned adjacent to the microcavities; and a color conversion panel including a plurality of color conversion media layers on the roof layer and the capping layer, wherein the capping layer is positioned along a trench formed between the plurality of microcavities.

19 Claims, 19 Drawing Sheets

(56) References Cited

U.S. PATENT DOCUMENTS

2016/0246114 A1* 8/2016 Kawamura ....... G02F 1/133528

FOREIGN PATENT DOCUMENTS

| KR | 10-2002-0047748 A | 6/2002 |
| KR | 10-2012-0026880 A | 3/2012 |
| KR | 10-2013-0129008 A | 11/2013 |
| KR | 10-2014-0022603 A | 2/2014 |
| KR | 10-2015-0078310 A | 7/2015 |

* cited by examiner

LIQUID CRYSTAL DISPLAY AND MANUFACTURING METHOD THEREOF

CROSS-REFERENCE TO RELATED APPLICATION

This application claims priority to, and the benefit of, Korean Patent Application No. 10-2015-0136119 filed in the Korean Intellectual Property Office on Sep. 25, 2015, the entire contents of which are incorporated herein by reference.

BACKGROUND (a) Field

Embodiments of the inventive concept relate generally to liquid crystal displays. More specifically, embodiments of the inventive concept relate to liquid crystal displays with lower profiles and improved color mixture characteristics and manufacturing method thereof.

(b) Description of the Related Art

A liquid crystal display, which is one of the most widely used flat panel display devices, includes two display panels where field generating electrodes such as a pixel electrode and a common electrode are formed, and a liquid crystal layer interposed therebetween.

The liquid crystal display generates an electric field in a liquid crystal layer by applying voltages to the field generating electrodes. The resulting electric field determines orientations of liquid crystal molecules of the liquid crystal layer and controls polarization of incident light, thereby displaying an image.

For one type of liquid crystal display, a technology for implementing a display by forming a plurality of microcavities and filling liquid crystal in the microcavities has been developed. In a conventional liquid crystal display, two sheets of substrates are used, but in this technology, constituent elements are formed on one substrate, thereby reducing the weight and thickness of the device.

In the manufacturing process of such a display device, liquid crystal is injected through injection holes in the microcavities, and an encapsulation process sealing the injection hole and protecting all the elements may be performed after injecting the liquid crystal.

However, light leakage is generated on a polarizer and a color filter in the liquid crystal display. A photo-luminescent liquid crystal display (PL-LCD) including a color conversion material is proposed to realize a liquid crystal display with high efficiency by reducing light leakage.

The above information disclosed in this Background section is only to enhance the understanding of the background of the invention and therefore it may contain information that does not form the prior art that is already known in this country to a person of ordinary skill in the art.

SUMMARY

The inventive concept provides a liquid crystal display capable of improving a color mixture of a color conversion panel and simplifying a structure of the display device, along with a manufacturing method thereof.

A liquid crystal display according to an exemplary embodiment of the inventive concept includes a substrate; a thin film transistor positioned on the substrate; a pixel electrode connected to the thin film transistor; a roof layer positioned to face the pixel electrode; a liquid crystal layer positioned between the pixel electrode and the roof layer within a plurality of microcavities; a capping layer positioned adjacent to the microcavities; and a color conversion panel including a plurality of color conversion media layers on the roof layer and the capping layer, wherein the capping layer is positioned along a trench formed between the plurality of microcavities.

A partition part may be disposed between adjacent microcavities and crossing the trench, and the capping layer may be removed from a region corresponding to the plurality of microcavities and the partition part.

The capping layer may include a water-soluble polymer material.

The capping layer may further include a photosensitive material to facilitate a photolithography process.

A first light blocking member overlapping at least one of the trench and the partition part and positioned on the thin film transistor may be further included.

The capping layer may further include a light blocking material, and the light blocking material may include a water-soluble black dye or a black pigment.

The capping layer may be positioned to correspond to the partition part.

A second light blocking member defining the plurality of color conversion media layers may be further included.

The plurality of color conversion media layers may include at least one of a phosphor and a quantum dot.

The plurality of color conversion media layers may include a red color conversion media layer and a green color conversion media layer.

The plurality of color conversion media layers may further include a transparent layer or a blue color conversion media layer disposed in the same layer as the red color conversion media layer and the green color conversion media layer.

A polarizer may be formed on the roof layer and the capping layer.

In addition, a method of manufacturing a liquid crystal display according to another exemplary embodiment of the inventive concept includes forming a thin film transistor on a substrate; forming a pixel electrode on the thin film transistor; forming a sacrificial layer on the pixel electrode; forming a roof layer on the sacrificial layer; removing the sacrificial layer to form a plurality of microcavities each having an injection hole; injecting a liquid crystal material to the microcavities through the injection holes; coating a capping material on the substrate to cover the roof layer and the injection holes; removing the capping material from the roof layer to form a capping layer disposed along a trench formed between adjacent microcavities; and forming a color conversion panel on the capping layer and the roof layer, the color conversion panel including a plurality of color conversion media layers.

The capping layer may be formed by disposing a mask on the substrate and using an exposure and developing process.

As described above, the liquid crystal display and the manufacturing method according to an exemplary embodiment of the inventive concept reduces the thickness of the capping layer, thereby improving the color mixture of the color conversion panel and simplifying the structure of the display device.

DETAILED DESCRIPTION OF THE EMBODIMENTS

Figure 1:
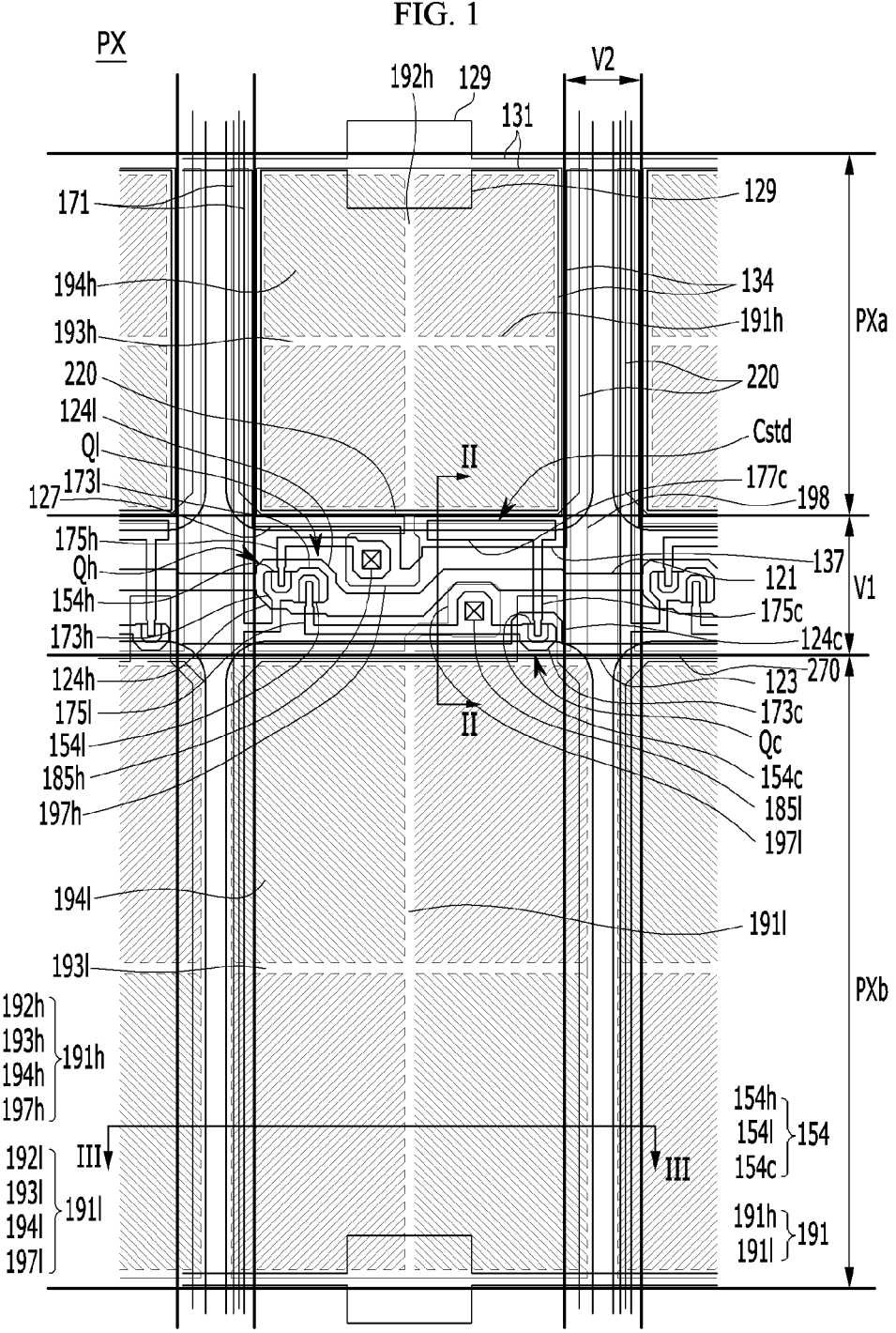
FIG. 1 is a top plan view of a plurality of adjacent pixels of a liquid crystal display according to an exemplary embodiment of the inventive concept.

The inventive concept will be described more fully hereinafter with reference to the accompanying drawings, in which exemplary embodiments of the invention are shown. As those skilled in the art would realize, the described embodiments may be modified in various different ways, all without departing from the spirit or scope of the inventive concept.

In the drawings, the thickness of layers, films, panels, regions, etc., are exaggerated for clarity. The various figures are thus not to scale. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. All numerical values are approximate, and may vary. All examples of specific materials and compositions are to be taken as nonlimiting and exemplary only. Other suitable materials and compositions may be used instead.

Next, a liquid crystal display according to an exemplary embodiment of the inventive concept will be described in detail with reference to FIG. 1 to FIG. 3.

Figure 2:
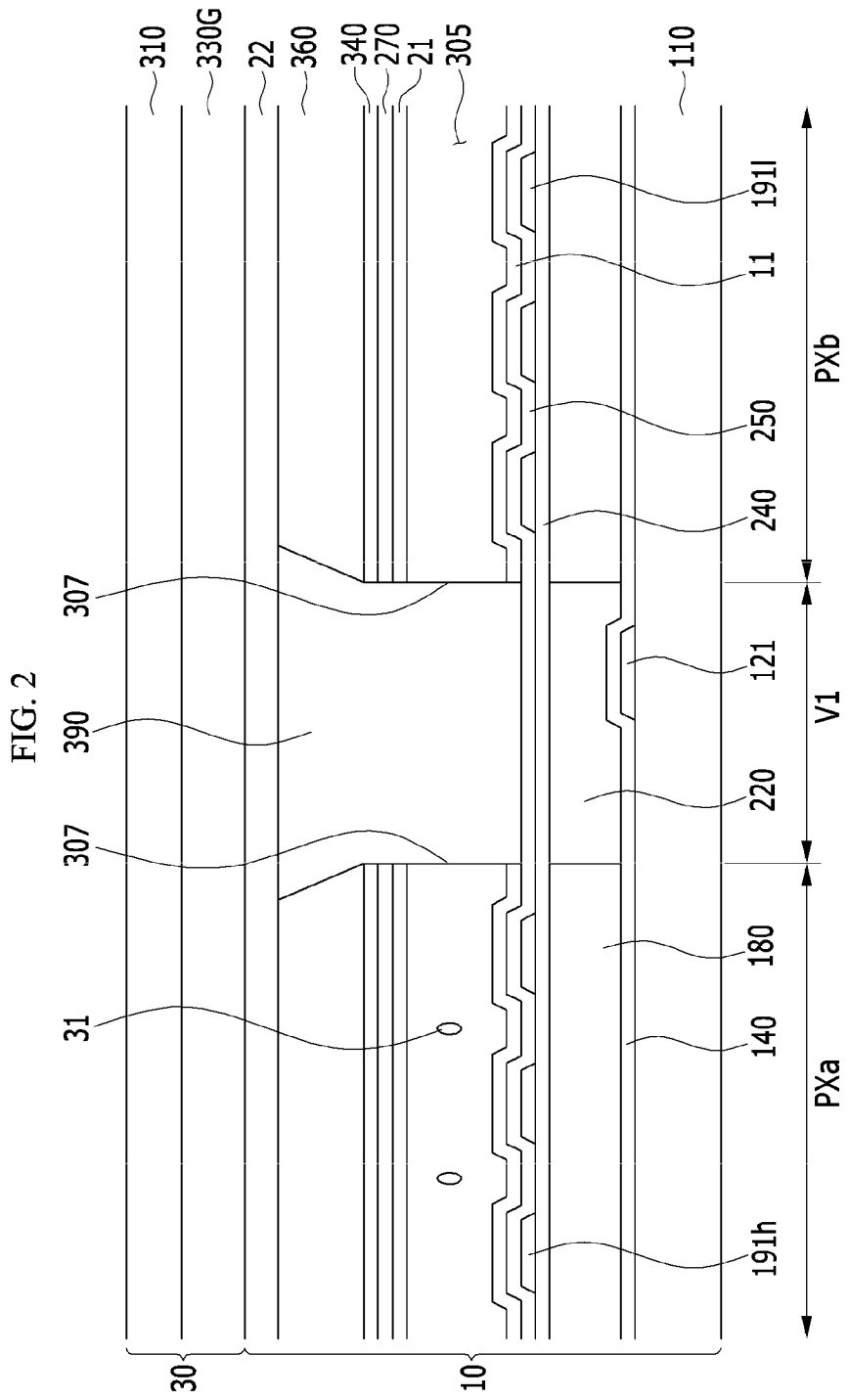
FIG. 2 is a cross-sectional view taken along line II-II of FIG. 1.
Figure 3:
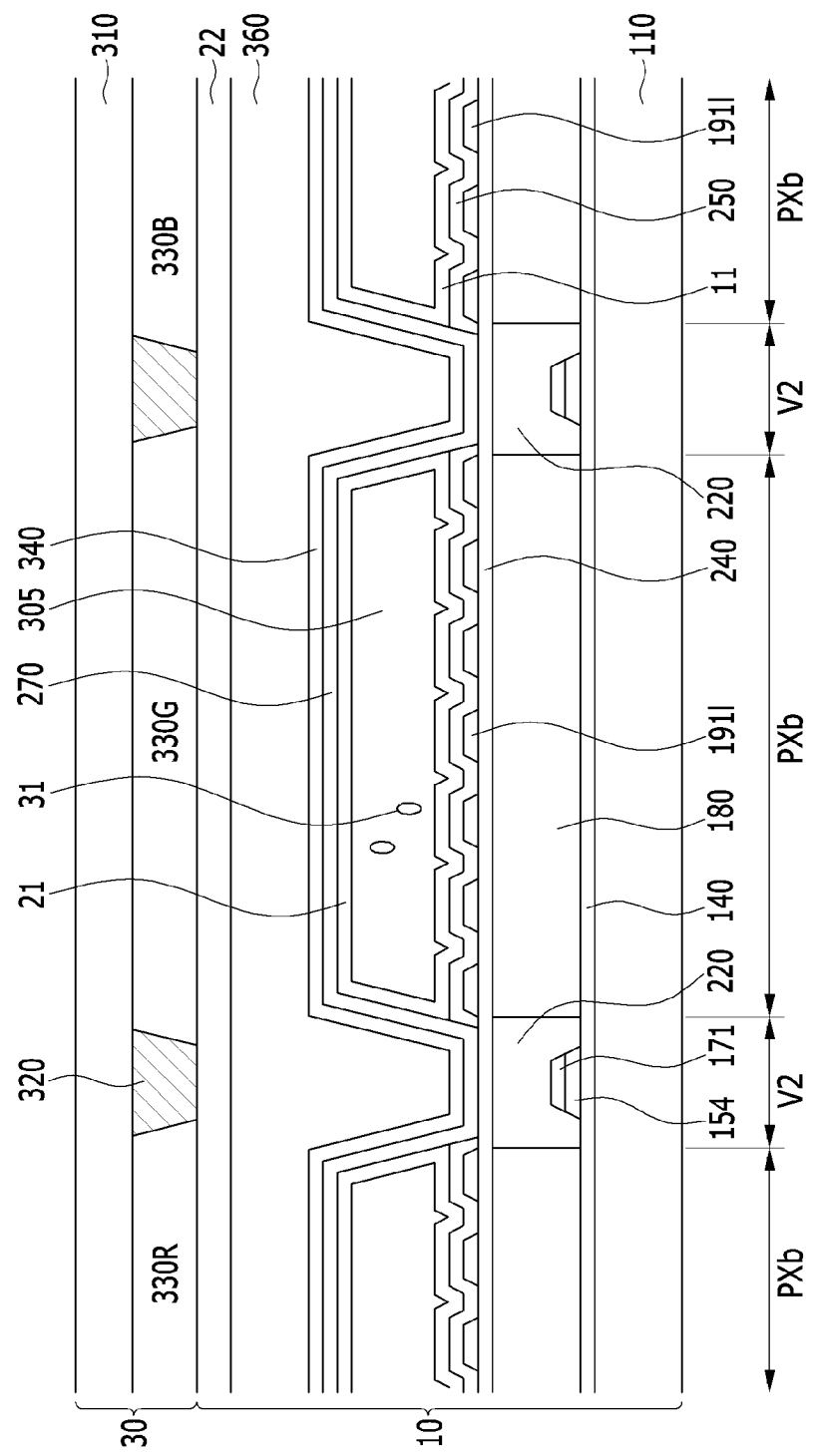
FIG. 3 is a cross-sectional view taken along line of FIG. 1.

FIG. 1 is a top plan view of a plurality of adjacent pixels of a liquid crystal display according to an exemplary embodiment of the inventive concept, FIG. 2 is a cross-sectional view taken along line II-II of FIG. 1, and FIG. 3 is a cross-sectional view taken along line of FIG. 1.

A liquid crystal display according to an exemplary embodiment of the inventive concept includes a display panel 10 and a color conversion panel 30. The color conversion panel 30 may be positioned on the display panel 10, however it is not limited thereto and the positions thereof may be changed depending on an exemplary embodiment.

First, the display panel 10 will be described.

The display panel 10 according to an exemplary embodiment of the inventive concept may include a polarizer 22. The polarizer 22 may be positioned on at least one surface of the display panel 10 and may be any type of polarizer, such as a film type, a coating type, or an adhering type.

The display panel 10 includes a first insulation substrate 110 formed of a material such as glass or plastic, and a roof layer 360 on the first insulation substrate 110.

A plurality of pixels PX is positioned on the first insulation substrate 110. The pixels PX are disposed in a matrix form including a plurality of pixel columns and a plurality of pixel rows. One pixel PX is a region overlapping one pixel electrode and may include a first subpixel PXa and a second subpixel PXb. The first subpixel PXa overlaps the first subpixel electrode 191$h$, and the second subpixel PXb overlaps the second subpixel electrode 191$l$. The first subpixel PXa and the second subpixel PXb may be disposed in a vertical direction that is a direction of extension of a data line.

A trench V1 is positioned along a direction of extension of a gate line between the first subpixel PXa and the second subpixel PXb, and a partition part V2 is positioned between adjacent columns of the pixel areas.

The roof layer 360 is formed in the direction of extension of the data line. In this case, the roof layer 360 is removed in the trench V1 such that an injection hole 307 is formed to expose constituent elements positioned under the roof layer 360.

Each roof layer 360 is formed to be separated from the first insulation substrate 110 between the adjacent partition parts V2, thereby forming a microcavity 305. Also, the partition part V2 is positioned between microcavities 305 which are adjacent in a horizontal direction. The partition part V2 is a part filling a separation microcavity between the microcavities 305 adjacent in the horizontal direction. The partition part V2 may be formed along the direction that the data line 171 extends.

The structure of the display panel 10 according to an exemplary embodiment of the inventive concept is only one example, and numerous variations are possible. For example, the arrangement shape of the pixel PX, the trench V1, and the partition part V2 may be changed, roof layers 360 may be connected to each other in the trench V1, and at least part of the roof layers 360 may include a connection part of a tunnel shape on the partition part V2 to connect adjacent microcavities 305 to each other.

Referring to FIG. 1 to FIG. 3, a plurality of gate conductors including a plurality of gate lines 121, a plurality of step-down gate lines 123, and a plurality of storage electrode lines 131 are disposed on the first insulation substrate 110.

The gate line 121 and the step-down gate line 123 mainly extend in the horizontal direction to transmit gate signals. The gate conductor further includes a first gate electrode 124$h$ and a second gate electrode 124$l$ protruding upward and downward from the gate line 121, and further includes a third gate electrode 124$c$ protruding upward from the step-down gate line 123. The first gate electrode 124$h$ and second gate electrode 124$l$ are connected with each other to form one protrusion. In this case, the protruding shapes of the first, second, and third gate electrodes 124$h$, 124$l$, and 124$c$ may be modified.

The storage electrode line 131 mainly extends in the horizontal direction and transmits a predetermined voltage such as a common voltage Vcom. The storage electrode line 131 includes storage electrodes 129 protruding upward and downward, a pair of vertical portions 134 extending downward to be substantially perpendicular to the gate line 121, and a horizontal portion 127 connecting ends of the pair of vertical portions 134. The horizontal portion 127 includes a capacitive electrode 137 extended downward.

A gate insulating layer 140 is disposed on the gate conductors 121, 123, 124$h$, 124$l$, 124$c$, and 131. The gate insulating layer 140 may be made of an inorganic insulating material such as a silicon nitride (SiNx) and a silicon oxide (SiOx). Further, the gate insulating layer 140 may be formed as a single layer or multiple layers.

A first semiconductor layer 154h, a second semiconductor layer 154l, and a third semiconductor layer 154c are disposed on the gate insulating layer 140. The first semiconductor layer 154h may be disposed on the first gate electrode 124h, the second semiconductor layer 154l may be disposed on the second gate electrode 124l, and the third semiconductor layer 154c may be disposed on the third gate electrode 124c. The first semiconductor layer 154h and the second semiconductor layer 154l may be connected to each other, and the second semiconductor layer 154l and the third semiconductor layer 154c may be connected to each other. Further, the first semiconductor layer 154h may be formed to be extended to the lower portion of the data line 171. The first, second, and third semiconductor layers 154h, 154l, and 154c may be made of amorphous silicon, polycrystalline silicon, a metal oxide, and the like. Ohmic contacts (not illustrated) may be further disposed on the first, second, and third semiconductors 154h, 154l, and 154c, respectively. The ohmic contacts may be made of silicide or a material such as n+ hydrogenated amorphous silicon in which an n-type impurity is doped at a high concentration.

A data conductor including a data line 171, a first source electrode 173h, a second source electrode 173l, a third source electrode 173c, a first drain electrode 175h, a second drain electrode 175l, and a third drain electrode 175c is disposed on the first, second, and third semiconductor layers 154h, 154l, and 154c.

The data line 171 transmits a data signal and mainly extends in a vertical direction to cross the gate line 121 and the step-down gate line 123. Each data line 171 extends toward the first gate electrode 124h and the second gate electrode 124l, and includes the first source electrode 173h and the second source electrode 173l which are connected with each other.

Each of the first drain electrode 175h, the second drain electrode 175l, and the third drain electrode 175c includes one wide end portion and another rod-shaped end portion. The rod-shaped end portions of the first drain electrode 175h and the second drain electrode 175l are partially surrounded by the first source electrode 173h and the second source electrode 173l, respectively. One wide end portion of the second drain electrode 175l is further extended to form a third source electrode 173c that is bent in a 'U' shape. A wide end portion 177c of the third drain electrode 175c overlaps the capacitive electrode 137 to form a step-down capacitor Cstd, and its rod-shaped end portion is partially surrounded by the third source electrode 173c.

The first gate electrode 124h, the first source electrode 173h, and the first drain electrode 175h form a first thin film transistor Qh together with the first semiconductor layer 154h; the second gate electrode 124l, the second source electrode 173l, and the second drain electrode 175l form a second thin film transistor Ql together with the second semiconductor layer 154l; and the third gate electrode 124c, the third source electrode 173c, and the third drain electrode 175c form the third thin film transistor Qc together with the third semiconductor layer 154c.

The first semiconductor layer 154h, the second semiconductor layer 154l, and the third semiconductor layer 154c are connected to each other to form a linear shape, and may have substantially the same planar shape as the data conductors 171, 173h, 173l, 173c, 175h, 175l, and 175c and the ohmic contacts therebelow, except at channel regions between the source electrodes 173h, 173l, and 173c and the drain electrodes 175h, 173l, and 175c.

In the first semiconductor layer 154h, an exposed portion which is not covered by the first source electrode 173h and the first drain electrode 175h is disposed between the first source electrode 173h and the first drain electrode 175h. In the second semiconductor layer 154l, an exposed portion which is not covered by the second source electrode 173l and the second drain electrode 175l is disposed between the second source electrode 173l and the second drain electrode 175l. In addition, in the third semiconductor layer 154c, an exposed portion which is not covered by the third source electrode 173c and the third drain electrode 175c is disposed between the third source electrode 173c and the third drain electrode 175c.

A first light blocking member 220 and a passivation layer 180 are formed on the data conductors 171, 173h, 173l, 173c, 175h, 175l, and 175c and the semiconductor layers 154h, 154l, and 154c, each of the source electrodes 173h/173l/173c, and each drain electrode 175h/175l/175c.

The first passivation layer 180a may be made of an organic insulating material or an inorganic insulating material, and may be formed as a single layer or multiple layers.

The first light blocking member 220 is positioned on the region in which the thin film transistor is positioned. The first light blocking member 220 is positioned on the boundary of the pixel PX and the thin film transistor, and may prevent light leakage. The passivation layer 180 may be respectively positioned on the first subpixel PXa and the second subpixel PXb, and the first light blocking member 220 may be positioned between the first subpixel PXa and the second subpixel PXb.

The first light blocking member 220 extends over the gate line 121 and the step-down gate line 123. The first light blocking member 220 may cover a region in which the first thin film transistor Qh, the second thin film transistor Ql, the third thin film transistor Qc, and the like are disposed, and/or may extend along the data line 171. That is, the first light blocking member 220 may be positioned on the trench V1 and the partition part V2. The passivation layer 180 and the first light blocking member 220 may partially overlap if desired.

In the passivation layer 180 and the first light blocking member 220, a plurality of first contact holes 185h and a plurality of second contact holes 185l, which expose the wide end portion of the first drain electrode 175h and the wide end portion of the second drain electrode 175l respectively, are formed.

A first insulating layer 240 is positioned on the passivation layer 180 and the first light blocking member 220, and a pixel electrode 191 is positioned on the first insulating layer 240. The pixel electrode 191 may be made of a transparent metal material such as indium tin oxide (ITO) and indium zinc oxide (IZO).

The pixel electrode 191 includes the first subpixel electrode 191h and the second subpixel electrode 191l, which are separated from each other with the gate line 121 and the step-down gate line 123 therebetween and disposed above and below the gate line 121 and the step-down gate line 123 so as to be adjacent to each other in the direction of extension of the data line 171. In other words, the first subpixel electrode 191h and the second subpixel electrode 191l are separated from each other with the trench V1 therebetween, the first subpixel electrode 191h is disposed in the first subpixel area PXa, and the second subpixel electrode 191l is disposed in the second subpixel area PXb.

The first subpixel electrode 191h and the second subpixel electrode 191l are connected to the first drain electrode 175h and the second drain electrode 175l through the first contact hole 185h and the second contact hole 185l, respectively. Accordingly, when the first thin film transistor Qh and the second thin film transistor Ql are turned on, the first thin film transistor Qh and the second thin film transistor Ql receive data voltages from the first drain electrode 175h and the second drain electrode 175l.

An overall shape of the first subpixel electrode 191h and the second subpixel electrode 191l is a quadrangle. Also, the first subpixel electrode 191h and the second subpixel electrode 191l include cross stems including horizontal stems 193h and 193l, and vertical stems 192h and 192l crossing the horizontal stems 193h and 193l, respectively. Further, the first subpixel electrode 191h and the second subpixel electrode 191l include a plurality of minute branch portions 194h and 194l, and protrusion portions 197h and 197l protruding upward or downward from edge sides of the subpixel electrodes 191h and 191l, respectively.

The pixel electrode 191 is divided into four subregions by the horizontal stems 193h and 193l and the vertical stems 192h and 192l. The minute branch portions 194h and 194l obliquely extend from the horizontal stems 193h and 193l and the vertical stems 192h and 192l, and the directions of extension may form an angle of about 45 degrees or 135 degrees with the gate line 121 or the horizontal stems 193h and 193l. Further, directions in which the minute branch portions 194h and 194l of two adjacent subregions extend may be perpendicular to each other.

In the exemplary embodiment, the first subpixel electrode 191h further includes an outer stem portion surrounding the outside thereof, and the second subpixel electrode 191l includes horizontal portions disposed at an upper end and a lower end and left and right vertical portions 198 disposed at the left and right sides of the first subpixel electrode 191h. The left and right vertical portions 198 may prevent capacitive coupling, that is, coupling between the data line 171 and the first subpixel electrode 191h.

The layout shape of the pixel area, the structure of the thin film transistor, and the shape of the pixel electrode described above are merely examples, and the inventive concept is not limited thereto and may be variously modified.

A second insulating layer 250 is disposed on the pixel electrode 191, and a common electrode 270 is disposed on the pixel electrode 191 such that it is separated by a predetermined distance from the pixel electrode 191. The microcavity 305 is formed between the pixel electrode 191 and the common electrode 270. That is, the microcavity 305 is surrounded by the pixel electrode 191 and the common electrode 270 to be differentiated for each pixel. A width and an area of the microcavity 305 may be variously modified according to a size and resolution of the display device.

The common electrode 270 may be made of a transparent metal material such as indium tin oxide (ITO) and indium zinc oxide (IZO). A predetermined voltage may be applied to the common electrode 270, and an electric field may be generated between the pixel electrode 191 and the common electrode 270.

A first alignment layer 11 is disposed on the second insulating layer 250. A second alignment layer 21 is formed below the common electrode 270 to face the first alignment layer 11.

The first alignment layer 11 and the second alignment layer 21 may be formed as vertical alignment layers and made of alignment materials such as polyamic acid, polysiloxane, and polyimide. The first and second alignment layers 11 and 21 may be connected to each other at an edge of the pixel area PX.

A liquid crystal layer including liquid crystal molecules 310 is formed in the microcavity 305 positioned between the pixel electrode 191 and the common electrode 270. The liquid crystal molecules 310 may have negative dielectric anisotropy, and may stand up in a direction perpendicular to the first insulation substrate 110 when no electric field is applied. That is, a vertical alignment may be implemented.

The first subpixel electrode 191h and the second subpixel electrode 191l to which the data voltage is applied generate an electric field together with the common electrode 270 to determine directions of the liquid crystal molecules 310 of the microcavity 305 between the two electrodes 191 and 270. As such, luminance of light passing through the liquid crystal layer varies according to the determined directions of the liquid crystal molecules 310.

A third insulating layer 340 may be further formed on the common electrode 270. The third insulating layer 340 may be made of an inorganic insulating material such as a silicon nitride (SiNx) and a silicon oxide (SiOx), and may be omitted if desired.

A roof layer 360 is formed on the third insulating layer 340, and may be made of an organic material. The microcavity 305 is formed below the roof layer 360, and the roof layer 360 is hardened by a curing process to maintain the shape of the microcavity 305. That is, the roof layer 360 is formed to be spaced apart from the pixel electrode 191 to define and maintain the microcavity 305 therebetween.

The roof layer 360 is formed in in each pixel area PX and the partition part V2 along an extension direction of the data line, and is not formed in, i.e. removed from, the trench V1. That is, the roof layer 360 is not formed between the first subpixel PXa and the second subpixel PXb. The microcavity 305 is formed below each roof layer 360 in each of the first subpixel area PXa and the second subpixel area PXb. In the partition part V2, the microcavity 305 is not formed below the roof layer 360, but is formed to be attached to the first insulation substrate 110. Accordingly, a thickness of the roof layer 360 disposed at the partition part V2 may be larger than a thickness of the roof layer 360 disposed in each of the first subpixel area PXa and the second subpixel area PXb. An upper surface and opposing sides of the microcavity 305 are covered by the roof layer 360.

An injection hole 307 exposing a part of the microcavity 305 is formed in the common electrode 270, the third insulating layer 340, and the roof layer 360, respectively. The injection holes 307 may be formed to face each other at the edges of the first subpixel area PXa and the second subpixel area PXb. For example, the injection holes 307 may be formed to correspond to a lower side of the first subpixel area PXa and an upper side of the second subpixel area PXb, to expose sides of their respective microcavities 305. Each microcavity 305 is exposed by its injection hole 307, and an aligning agent or a liquid crystal material is injected into each microcavity 305 through its injection hole 307.

Next, a capping layer 390 is positioned on the trench V1 and covers the injection hole 307 of the microcavity 305 exposed by the trench V1. The capping layer 390 may contact the liquid crystal material positioned in the microcavities 305. In detail, the capping layer 390 is continuously positioned along the trench V1 and may not be formed on the microcavity 305 corresponding to the pixel.

The capping layer 390 according to the present exemplary embodiment includes a water-soluble polymer material, a photosensitive material, and a moisture-curing adhesive.

In the present exemplary embodiment, the water-soluble polymer material may be polyvinyl alcohol represented by Chemical Formula 1. Also, the water-soluble polymer material of the present exemplary embodiment may include at least one of methoxypolyethylene glycol, polyethylene glycol, poly(ethylene glycol) diacrylate, polyethylene glycol dimethacrylate, and polyvinylpyrrolidone. Chemical Formula 1, n indicates a number of repeating units and may be a natural number.

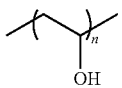

[Chemical Formula 1]

In the present exemplary embodiment, the photosensitive material may include at least one of ammonium dichromate, a diazo resin, a styrylpyridium group, and a stilbazolium group. The capping layer 390 includes the photosensitive material to facilitate a photolithography process.

A polarizer 22 is positioned on the capping layer 390 and the roof layer 360, and the color conversion panel 30 is positioned on the polarizer 22.

Next, the color conversion panel 30 will be described in detail.

The color conversion panel 30 includes a second insulation substrate 310, a plurality of upper light blocking members 320, a plurality of red color conversion media layers 330R, a plurality of green color conversion media layers 330G, and a plurality of blue color conversion media layers 330B.

The color conversion panel 30 directly contacts the upper surface of the polarizer 22.

Each second light blocking member 320 may overlap a corresponding first light blocking member 220. Also, each second light blocking member 320 partitions a region where the red color conversion media layers 330R, the green color conversion media layers 330G, and the blue color conversion media layers 330B are disposed, and the red color conversion media layers 330R, the green color conversion media layers 330G, and the blue color conversion media layers 330B are disposed between second light blocking members 320.

The red color conversion media layers 330R convert blue light supplied from the backlight assembly (not shown) into red light. The red color conversion media layers 330R may be formed of a red phosphor, and at least one of (Ca, Sr, Ba)S, (Ca, Sr, Ba)2Si5N8, CaAlSiN3, CaMoO4, and Eu2Si5N8 may be used as the red phosphor.

The green color conversion media layers 330G convert blue light supplied from the backlight assembly (not shown) into green light. The green color conversion media layers 330G are formed of a green phosphor, and at least one of yttrium aluminum garnet (YAG), (Ca, Sr, Ba)2SiO4, SrGa2S4, aluminium magnesium boride (BAM), α-SiAlON, β-SiAlON, Ca3Sc2Si3O12, Tb3Al5O12, BaSiO4, and CaAlSiON, and (Sr1-xBax)Si2O2N2 may be used as the green phosphor.

The blue color conversion media layers 330B are formed of a blue phosphor, and one material among $BaMgAl_{10}O_{17}$, $(Mg, Ca, Sr, Ba)_5 PO_{43}Cl$, $EuSi_9Al_{19}ON_{31}$, $La_{1-x}Ce_xAl(Si_{6-z}Al_z)(N_{10-z}O_z)$ may be used as the blue phosphor. The blue phosphor receives ultraviolet rays to emit and diffuse blue light.

Also, the red color conversion media layers 330R, the green color conversion media layers 330G, and the blue color conversion media layers 330B may be formed of quantum dots, a color of which changes according to the size.

The quantum dot may be selected from a Group II-VI compound, a Group IV-VI compound, a Group IV element, a Group IV compound, and a combination thereof.

The group II-VI compound may be selected from: a group of two-element compounds selected from CdSe, CdTe, ZnS, ZnSe, ZnTe, ZnO, HgS, HgSe, HgTe, MgSe, MgS, and a mixture thereof; a group of three-element compounds selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a group of four-element compounds selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. A group III-V compound may be selected from: a group of two-element compounds selected from GaN, GaP, GaAs, GaSb, AlN, AlP, AlAs, AlSb, InN, InP, InAs, InSb, and a mixture thereof; a group of three-element compounds selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a group of four-element compounds selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. The group IV-VI compound may be selected from: a group of two-element compounds selected from SnS, SnSe, SnTe, PbS, PbSe, PbTe, and a mixture thereof; a group of three-element compounds selected from SnSeS, SnSeTe, SnSTe, PbSeS, PbSeTe, PbSTe, SnPbS, SnPbSe, SnPbTe, and a mixture thereof; and a group of four-element compounds selected from SnPbSSe, SnPbSeTe, SnPbSTe, and a mixture thereof. The group IV element may be selected from a group of Si, Ge, and a mixture thereof. The group IV compound may be a two-element compound selected from a group of SiC, SiGe, and a mixture thereof.

In this case, the binary compound, the tertiary compound, or the quaternary compound may be present in particles in uniform concentrations, or may have partially different concentrations in the same particle, respectively. In addition, a core/shell structure in which some quantum dots enclose some other quantum dots may be possible. An interfacing surface between the core and the shell may have a concentration gradient in which a concentration of an element decreases closer to its center.

The quantum dots may have a full width at half maximum (FWHM) of a light-emitting wavelength spectrum of about 45 nm or less, preferably about 40 nm or less, and more preferably about 30 nm or less. In the quantum dots having such a FWHM, the color purity or color reproducibility may be improved.

In addition, shapes of the quantum dots are not specifically limited to shapes that are generally used in the related art, but more specifically, it may be desirable that a nanoparticle having a spherical, pyramidal, multi-arm, or cubic shape, and a nanotube, a nanowire, a nanofiber, and a planar nanoparticle be used.

Differently from the present exemplary embodiment, the blue color conversion media layer 330B may be a transparent layer made of a transparent polymer.

In the liquid crystal display according to the present exemplary embodiment, the capping layer 390 on the display panel 10 is only formed in the trench V1, but is not formed on the roof layer 360. As a result, the distance between the liquid crystal layer and the color conversion panel 30 may be reduced.

When the capping layer 390 is disposed on the roof layer 360, some of the light passing through the liquid crystal layer may also pass through the capping layer 390 disposed between the liquid crystal layer and the color conversion panel 30, thereby causing color mixture between adjacent color conversion media layers. Accordingly, to prevent color mixture between adjacent color conversion media layers, a method of additionally forming light blocking members at positions corresponding to the second light blocking member 320 on the capping layer 390 has been proposed.

However, in the liquid crystal display according to the present exemplary embodiment, the capping layer 390 over the microcavities 305 is omitted and is only formed on the trench V1 to minimize the thickness of the capping layer 390, thereby improving the color mixture that may be generated in the color conversion panel 30.

The abovementioned additional light blocking member may be omitted, thereby simplifying aspects of the structure and the process.

Hereinafter, a method of manufacturing a liquid crystal display according to an exemplary embodiment of the inventive concept will be described with reference to FIG. 4 to FIG. 17.

FIG. 4, FIG. 6, FIG. 8, FIG. 10, FIG. 12, FIG. 14, and FIG. 16 are cross-sectional views sequentially showing a manufacturing method according to an exemplary embodiment of the inventive concept taken along line II-II of FIG. 1, and FIG. 5, FIG. 7, FIG. 9, FIG. 11, FIG. 13, FIG. 15, and FIG. 17 are cross-sectional views sequentially showing a manufacturing method according to an exemplary embodiment of the inventive concept taken along line of FIG. 1.

Figure 4:
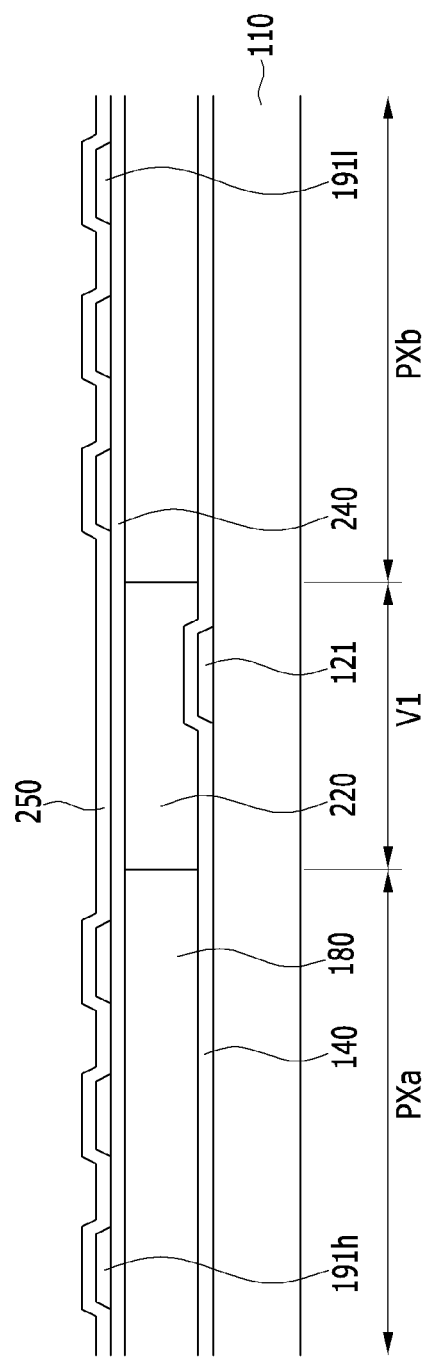
FIG. 4, FIG. 6, FIG. 8, FIG. 10, FIG. 12, FIG. 14, and FIG. 16 are cross-sectional views sequentially showing a manufacturing method according to an exemplary embodiment of the inventive concept taken along line II-II of FIG. 1.
Figure 5:
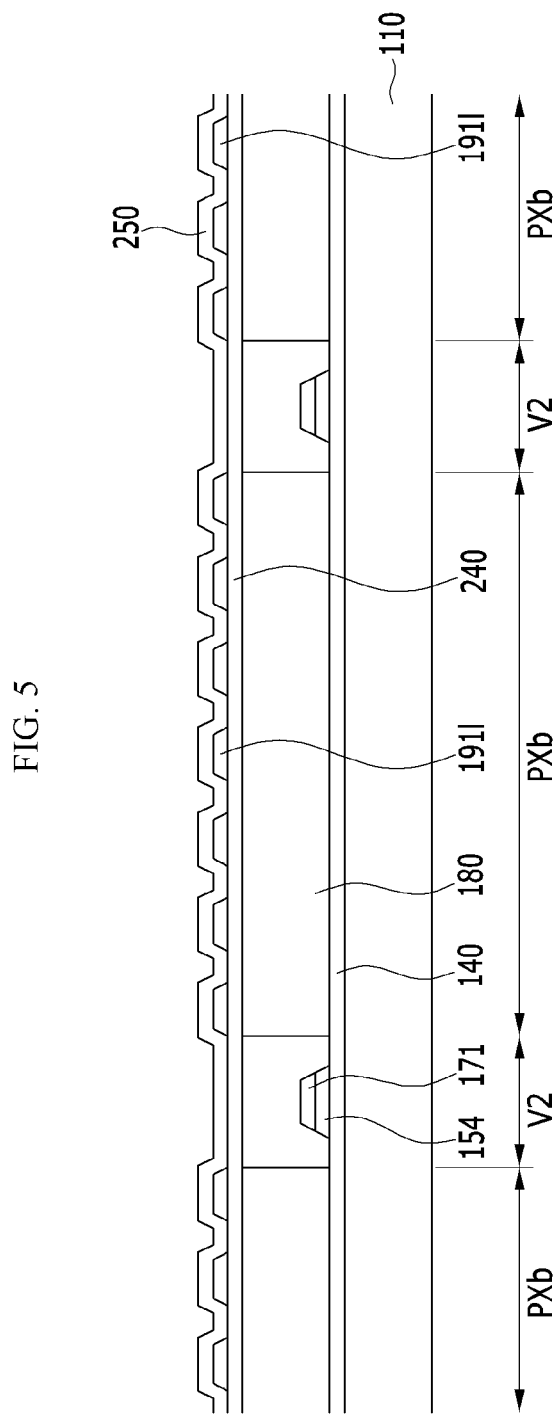
FIG. 5, FIG. 7, FIG. 9, FIG. 11, FIG. 13, FIG. 15, and FIG. 17 are cross-sectional views sequentially showing a manufacturing method according to an exemplary embodiment of the inventive concept taken along line of FIG. 1.

First, as illustrated in FIG. 4 and FIG. 5, a gate line 121 and a step-down gate line 123 extending in one direction are formed on a first substrate 110 that is made of glass or plastic. A first gate electrode 124$h$, a second gate electrode 124$l$, and a third gate electrode 124$c$ which protrude from the gate line 121 are also formed.

In addition, a storage electrode 131 may be formed at a distance from the gate line 121, the step-down gate line 123, and the first to third gate electrodes 124$h$, 124$l$, and 124$c$.

Next, a gate insulating layer 140 is formed by depositing an inorganic insulating material such as a silicon oxide (SiOx) or a silicon nitride (SiNx) on the entire surface of the first substrate 110, including the gate line 121, the step-down gate line 123, the first to third gate electrodes 124$h$, 124$l$, and 124$c$, and the storage electrode line 131. The gate insulating layer 140 may be formed as a single layer or multiple layers.

Then, a semiconductor material such as amorphous silicon, polycrystalline silicon, a metal oxide, and the like is deposited to the gate insulating layer 140. This semiconductor material is patterned so as to form a first semiconductor 154$h$, a second semiconductor 154$l$, and a third semiconductor 154$c$. The first semiconductor 154$h$ may be disposed on the first gate electrode 124$h$, the second semiconductor 154$l$ may be disposed on the second gate electrode 124$l$, and the third semiconductor 154$c$ may be disposed on the third gate electrode 124$c$.

Next, a metal material is deposited and then patterned so as to form a data line 171. The metal material may be formed as a single layer or multiple layers.

A first source electrode 173$h$ extending over the first gate electrode 124$h$ from the data line 171, and a first drain electrode 175$h$ spaced apart from the first source electrode 173$h$, are formed at the same time. In addition, a source electrode 173$l$ connected with the first source electrode 173$h$ and a second drain electrode 173$l$ spaced apart from the second source electrode 173$l$ are formed substantially simultaneously. Further, a third source electrode 173$c$ extended from the second drain electrode 175$l$ and a third drain electrode 175$c$ spaced apart from the third source electrode 173$c$ are formed in the same step.

After sequential deposition of the semiconductor material and the metal material, the two materials may be simultaneously patterned so as to form the first to third semiconductors 154$h$, 154$l$, and 154$c$, the data line 171, the first to third source electrodes 173$h$, 173$l$, and 173$c$, and the first to third drain electrodes 175$h$, 175$l$, and 175$c$. In this case, the first semiconductor 154$h$ is extended to the lower portion of the data line 171.

The first, second, and third gate electrodes 124$h$, 124$l$, and 124$c$, the first, second, and third source electrodes 173$h$, 173$l$, 173$c$, and the first, second, and third drain electrodes 175$h$, 175$l$, 175$c$ form first, second, and third thin film transistors (TFTs) Qh, Ql, and Qc together with the first, second, and third semiconductors 154$h$, 154$l$, and 154$c$.

Next, a passivation layer 180 and a first light blocking member 220 are formed on the semiconductors 154$h$, 154$l$, and 154$c$, the first to third source electrodes 173$h$, 173$l$, and 173$c$, the first to third drain electrodes 175$h$, 175$l$, and 175$c$, the respective source electrodes 173$h$, 173$l$, and 173$c$, and the respective drain electrodes 175$h$, 175$l$, and 175$c$. The passivation layer 180 may be made of an organic insulating material or an inorganic insulating material, and may be formed as a single layer or multiple layers. The first light blocking member 220 may be formed to be positioned on the trench V1 and the partition part V2.

Next, a first insulating layer 240 made of an inorganic insulating material such as a silicon nitride (SiNx), a silicon oxide (SiOx), and a silicon oxynitride (SiOxNy) is formed on the passivation layer 180 and the first light blocking member 220.

Next, a first contact hole 185$h$ is formed by etching the passivation layer 180, the first light blocking member 220, and the first insulating layer 240 so as to expose a part of the first drain electrode 175$h$. In similar manner, a second contact hole 185$l$ is formed so as to expose a part of the second drain electrode 175$l$.

Next, a first subpixel electrode 191$h$ is formed in the first subpixel area PXa, and a second subpixel electrode 191$l$ is formed in the second subpixel area PXb, by depositing and then patterning a transparent metal material such as indium tin oxide (ITO) and indium zinc oxide (IZO) on the first insulating layer 240. The first subpixel electrode 191$h$ and the second subpixel electrode 191$l$ may be separated from each other with the trench V1 therebetween. The first subpixel electrode 191$h$ is connected to the first drain electrode 175$h$ through the first contact hole 185$h$, and the second subpixel electrode 191$l$ is connected to the second drain electrode 175$l$ through the second contact hole 185$l$.

Horizontal stems 193$h$ and 193$l$, and vertical stems 192$h$ and 192$l$ crossing the horizontal stems 193$h$ and 193$l$, are formed in the first subpixel electrode 191$h$ and the second subpixel electrode 191$l$, respectively. Further, a plurality of minute branch portions 194$h$ and 194$l$, which obliquely extend from the horizontal stems 193$h$ and 193$l$ and the vertical stems 192$h$ and 192$l$, is formed.

Next, the second insulating layer 250 is formed on the pixel electrode 191 and the first insulating layer 240.

Figure 6:
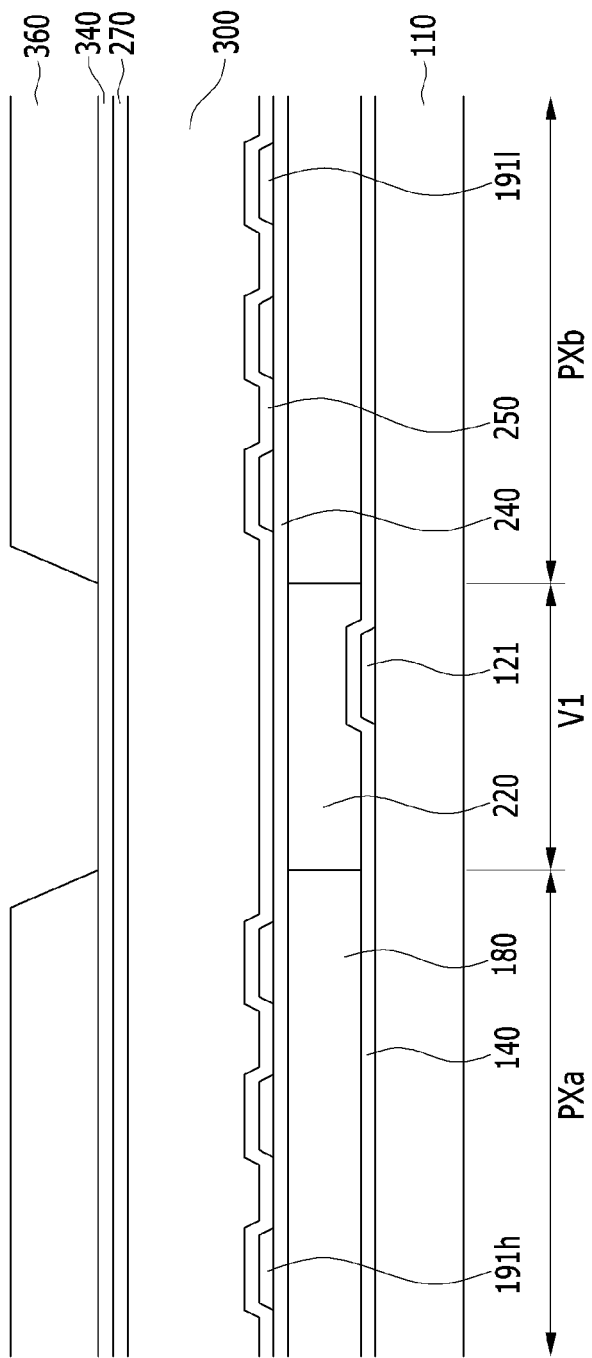
Figure 7:
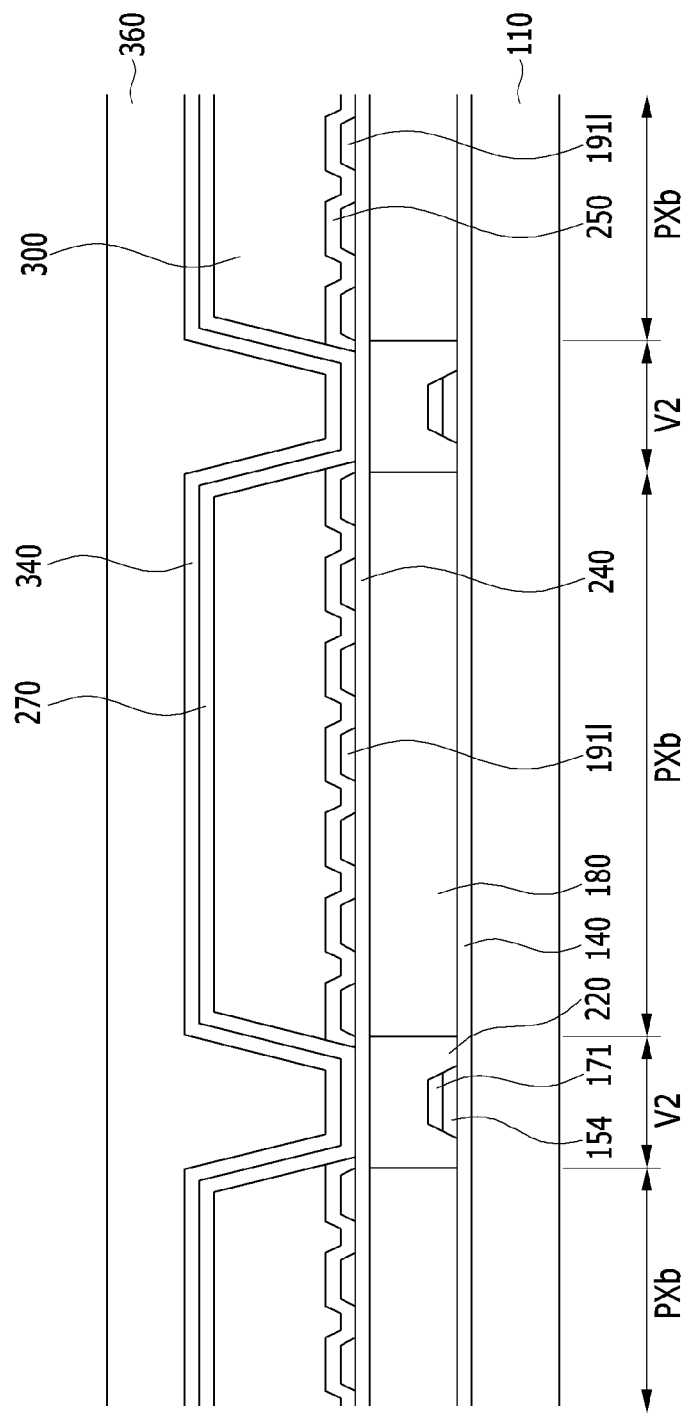

As illustrated in FIGS. 6 and 7, a photosensitive organic material is applied on the second insulating layer 250, and sacrificial layers 300 are formed through a photo process.

The sacrificial layers 300 are formed to be connected along pixel columns. That is, the sacrificial layer 300 is formed to cover each pixel area PX and to cover the trench V1 positioned between the first subpixel area PXa and the second subpixel area PXb.

Next, a common electrode 270 is formed by depositing a transparent metal material, such as an indium tin oxide (ITO) and an indium zinc oxide (IZO), on the sacrificial layer 300.

Next, a third insulating layer 340 may be formed on the common electrode 270. The third insulating layer 340 may be formed of an inorganic insulating material, such as a silicon nitride (SiNx), a silicon oxide (SiOx), and a silicon nitride oxide (SiOxNy).

Next, the roof layer 360 is formed by coating an organic material onto the third insulating layer 340, and patterning the organic material. In this case, the organic material may be patterned so that the organic material positioned in the trench V1 is removed. Accordingly, the roof layers 360 may be connected along pixel rows.

In the meantime, the roof layers 360 are not formed to be positioned in the trench areas, so that adjacent roof layers 360 are a microcavity apart from each other with a valley area interposed therebetween. The roof layer 360 of the region adjacent to the trench V1 may be formed to have the surface that is inclined.

Alternatively, the partition part V2 may fill the separation between adjacent microcavities 305 in the horizontal direction, i.e. may be formed along the direction that the data line 171 extends.

Figure 8:
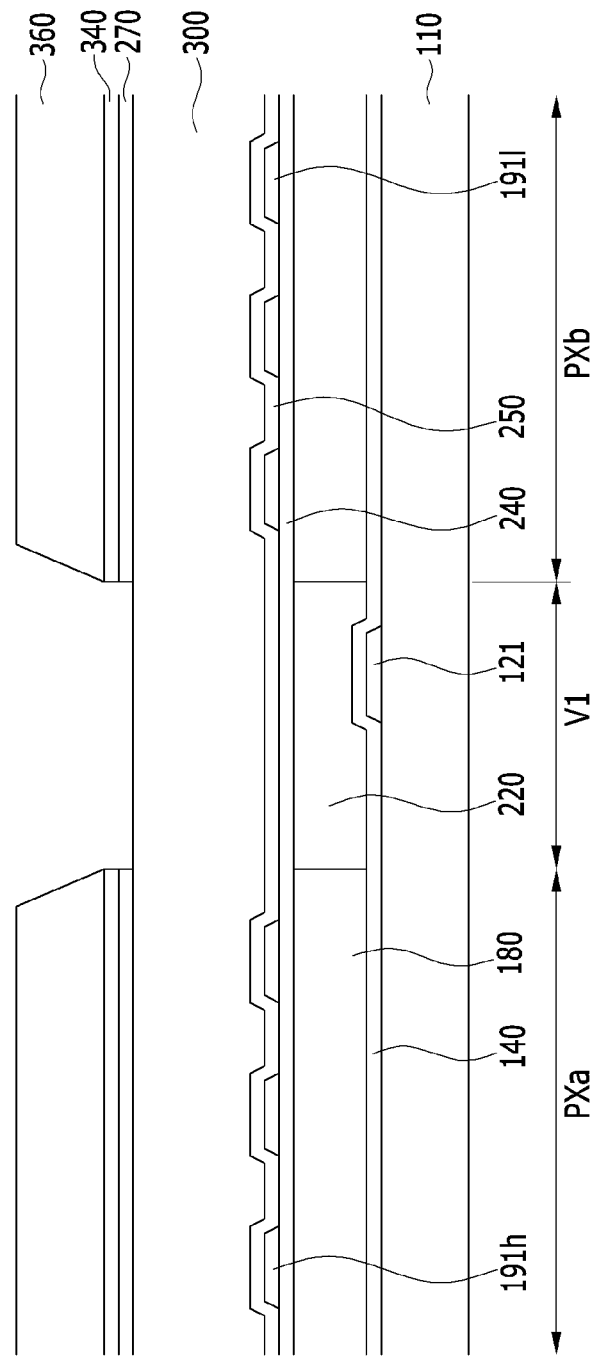
Figure 9:
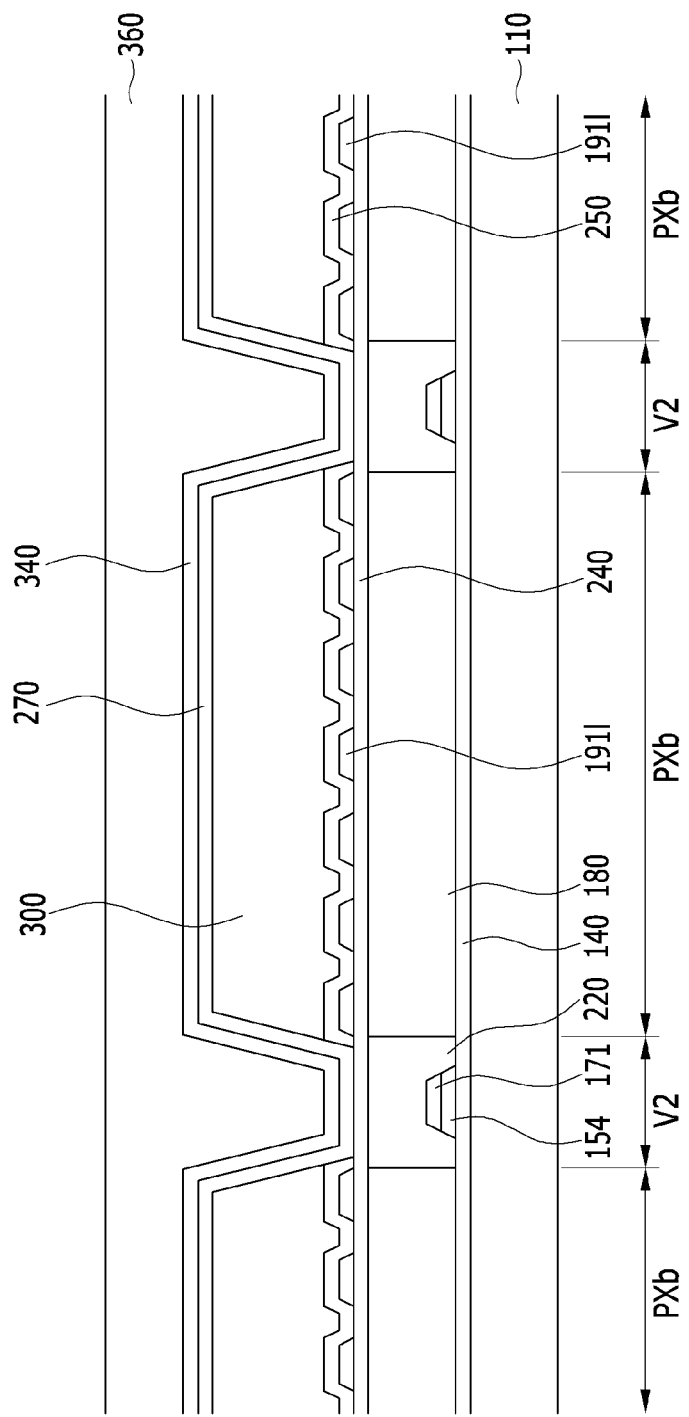

Next, as illustrated in FIGS. 8 and 9, the third insulating layer 340 and the common electrode 270 are patterned by using the roof layer 360 as a mask. First, the third insulating layer 340 is dry etched by using the roof layer 360 as a mask, and then the common electrode 270 is wet etched.

Figure 10:
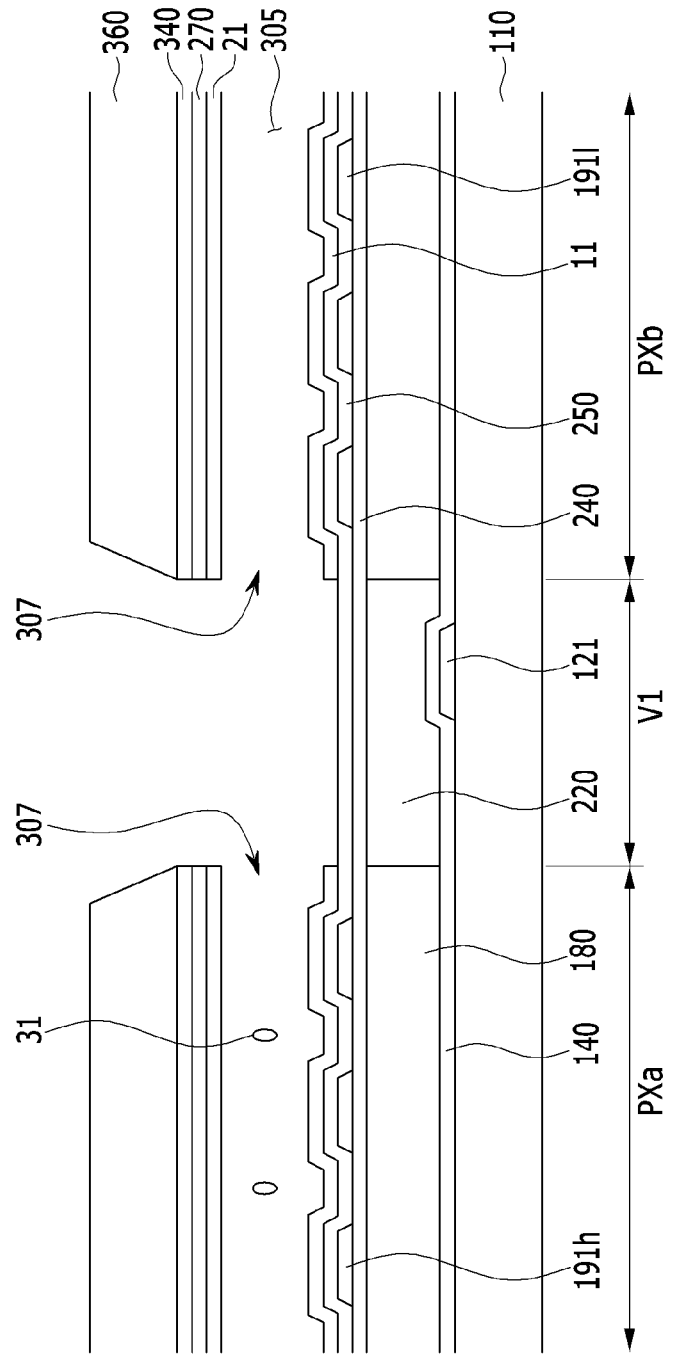
Figure 11:
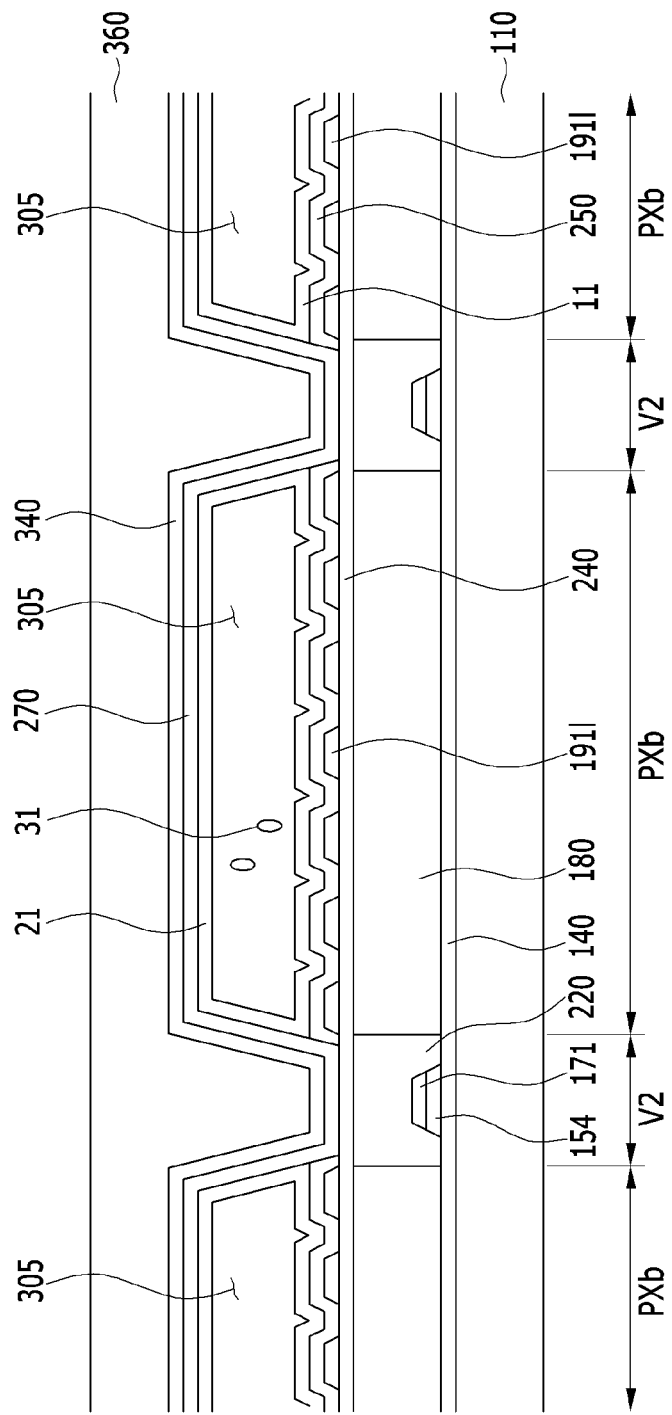

Next, as illustrated in FIG. 10 and FIG. 11, the sacrificial layer 300 is completely removed by supplying a developer or a stripper solution onto the first insulating substrate 110, in which the sacrificial layer 300 is exposed, or by using an ashing process.

If the sacrificial layer 300 is removed, the microcavity 305 is formed at a position at which the sacrificial layer 300 was positioned.

The pixel electrode 191 and the common electrode 270 are a microcavity apart from each other with the microcavity 305 interposed therebetween. The common electrode 270 and the roof layer 360 are formed to cover an upper surface and both lateral surfaces of the microcavity 305.

The interior of the microcavity 305 is exposed through a portion in which the roof layer 360, the third insulating layer 340, and the common electrode 270 are removed. This portion is referred to as the injection hole 307. The injection hole 307 is formed along the trench V1. For example, injection holes 307 may be formed to face each other at edges of the first subpixel area PXa and the second subpixel area PXb. That is, injection holes 307 may be formed to expose side surfaces of the microcavity 305 that correspond to a lower side of the first subpixel area PXa and an upper side of the second subpixel area PXb. Alternatively, injection holes 307 may be formed along the partition part V2.

Subsequently, the roof layer 360 is cured by applying heat to the first insulation substrate 110. This is for the purpose of hardening the roof layer 360 so that it assists in maintaining the shape of the microcavity 305.

Subsequently, when an alignment agent including an alignment material is dropped on the first insulation substrate 110 by a spin coating method or an inkjet method, the alignment agent is injected into the microcavity 305 through the injection hole 307. When a curing process is performed after the aligning agent is injected into the microcavity 305, a solution component is vaporized and the alignment material remains on an inner wall surface of the microcavity 305.

Accordingly, the first alignment layer 11 may be formed on the pixel electrode 191, and the second alignment layer 21 may be formed under the common electrode 270. The first alignment layer 11 and the second alignment layer 21 are formed to face each other with the microcavity 305 interposed therebetween, and are formed to be connected to each other at the edge of the pixel area PX.

In this case, the first and second alignment layers 11 and 21 may be aligned in a direction that is vertical to the insulating substrate 110, except for the lateral surface of the microcavity 305. The first and second alignment layers 11 and 21 may be aligned in a direction that is horizontal to the first insulation substrate 110 by additionally irradiating UV upon the first and second alignment layers 11 and 21.

Subsequently, when the liquid crystal material formed of the liquid crystal molecules 310 is dropped on the first insulation substrate 110 by an inkjet method or a dispensing method, the liquid crystal material is injected into the microcavity 305 through the injection hole 307. In particular, when the liquid crystal material is dropped onto the injection hole 307 formed along the trench V1, the liquid crystal material enters the microcavity 305 through the injection hole 307 by capillary force.

Figure 12:
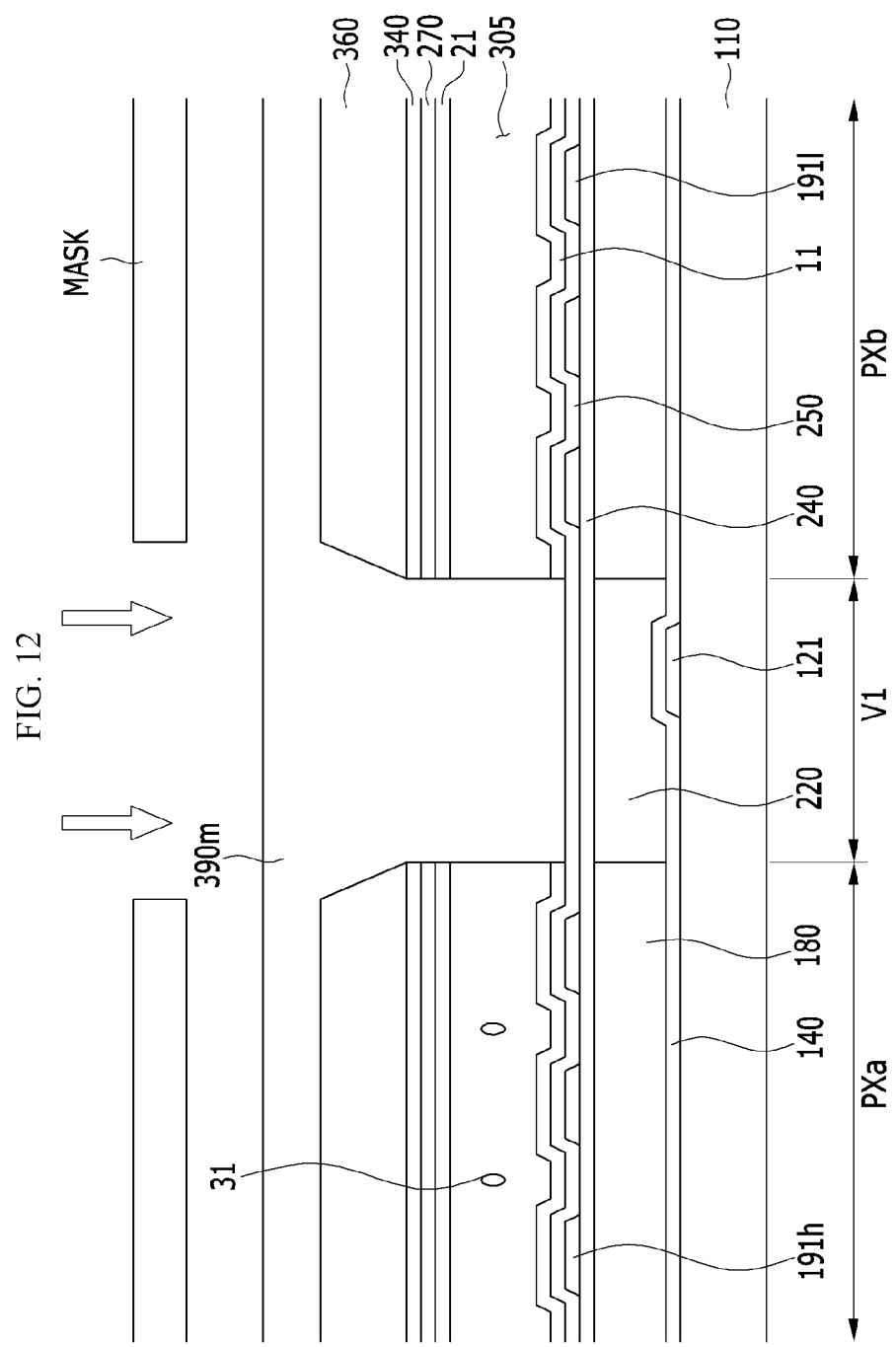
Figure 13:
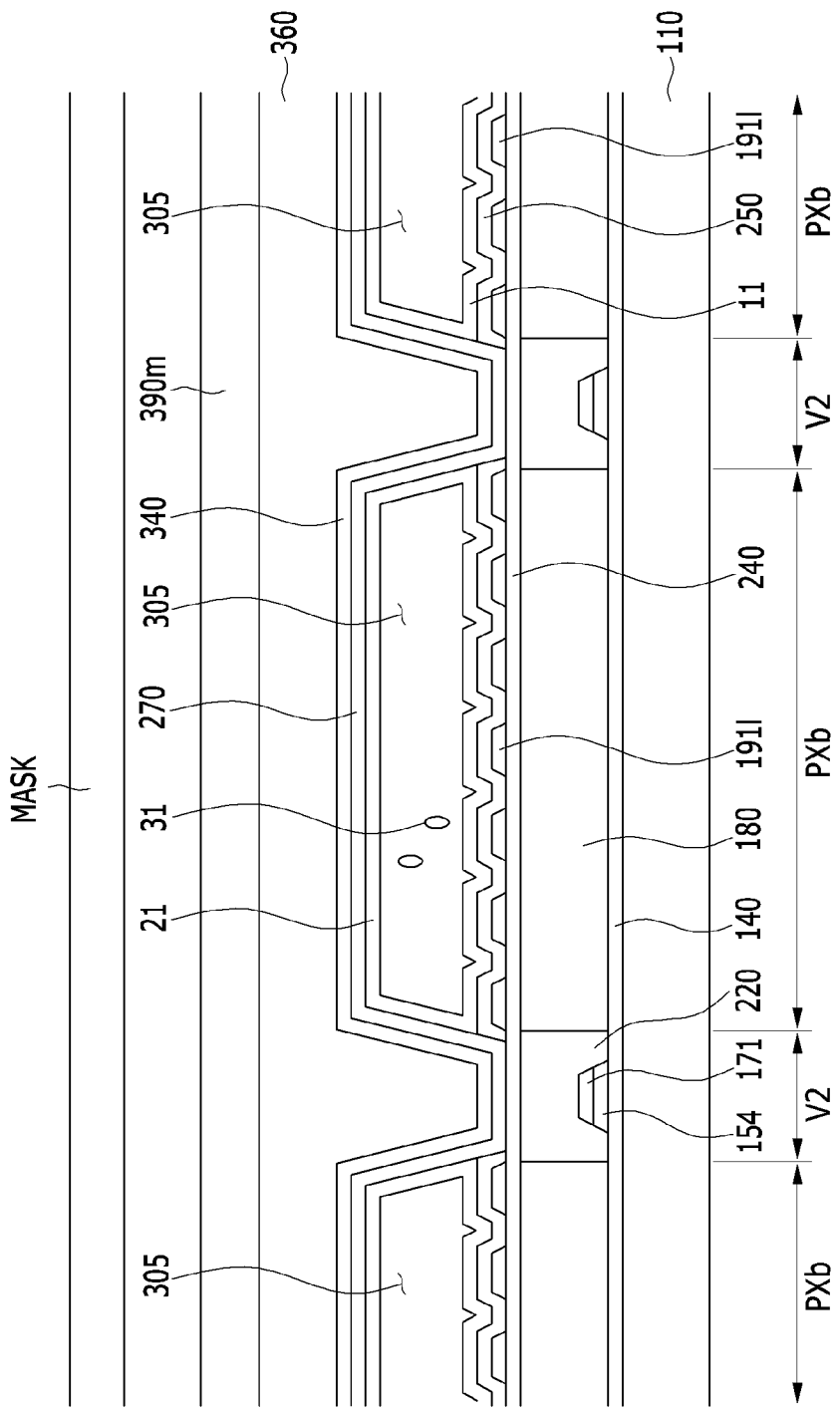

As shown in FIG. 12 and FIG. 13, after injecting the liquid crystal material inside the microcavity 305, a capping material 390m is coated on the entire surface of the first insulation substrate 110 to cover the trench V1.

Next, the pixel PX corresponding to the plurality of microcavities 305 is covered by a mask MASK for exposure. That is, the entire surface of the first insulation substrate 110 except for the trench V1 is covered for exposure.

Figure 14:
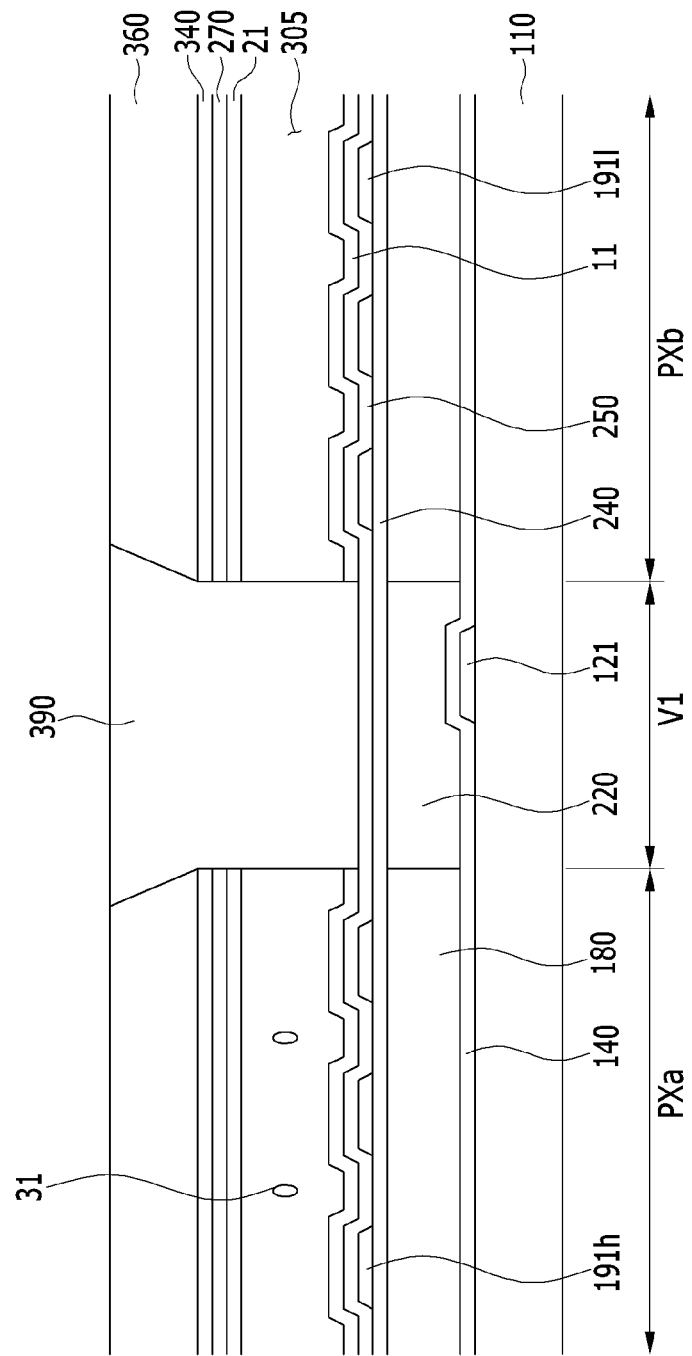
Figure 15:
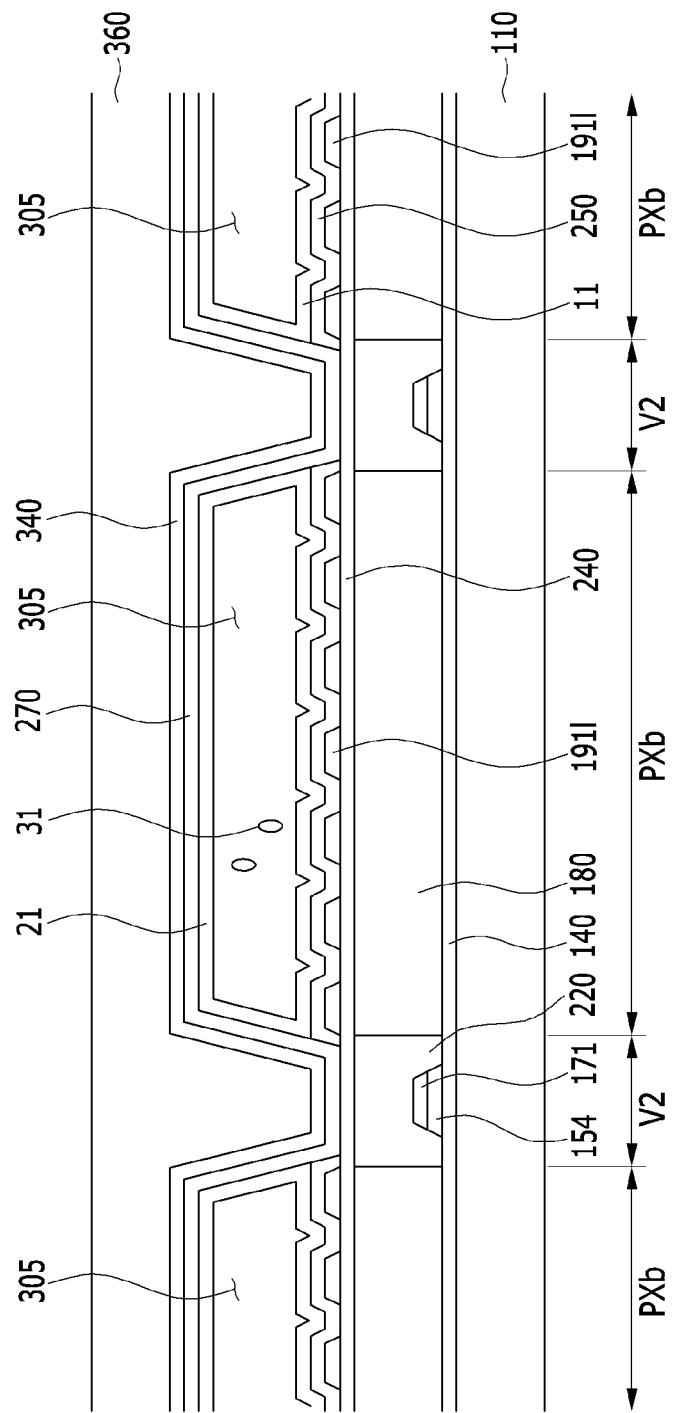

Next, as shown in FIG. 14 and FIG. 15, the capping material 390m positioned on the pixel PX is removed by developing after removing the mask MASK. In this manner, the capping layer 390 is removed except for that portion which is positioned along the trench V1.

In the present exemplary embodiment, patterning is performed using a negative photoresist in which a portion not receiving light is removed during exposure. However, alternatively, the capping material may be formed of a material having a positive photoresist property, and in this case, patterning may be performed by using a mask that is a reverse image of the aforementioned mask MASK.

Figure 16:
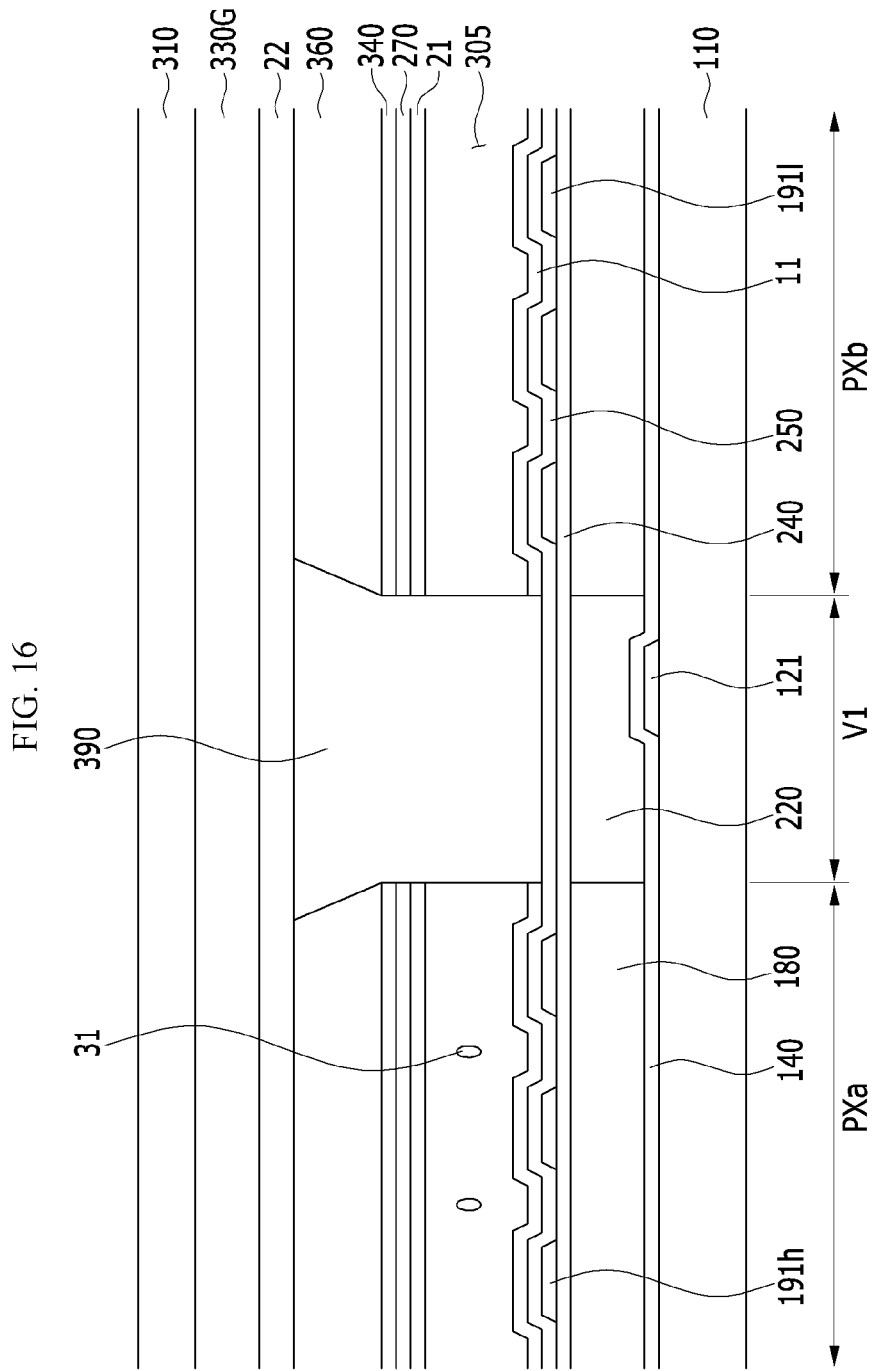
Figure 17:
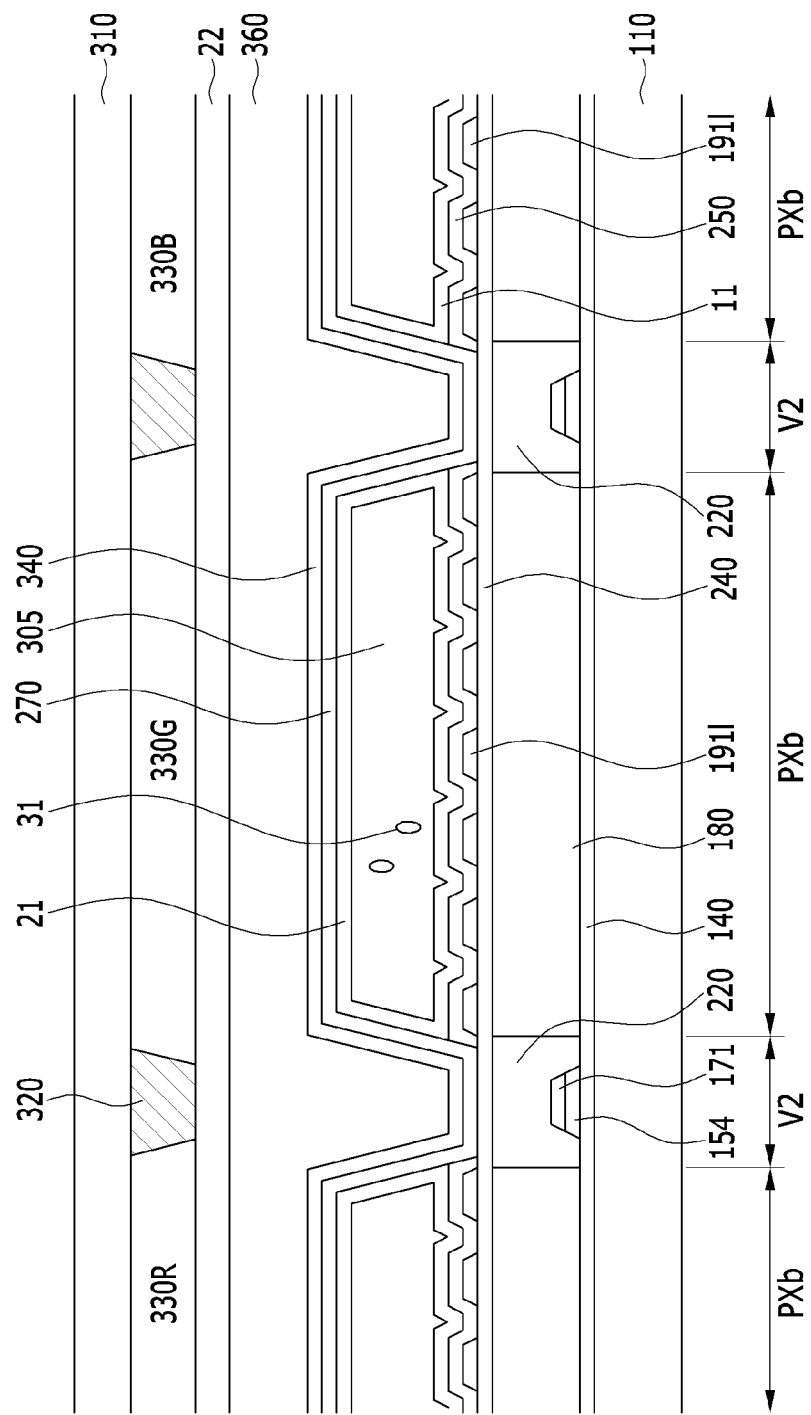

Next, as shown in FIG. 16 and FIG. 17, by positioning the polarizer 22 and the color conversion panel 30 on the display panel 10, the liquid crystal display according to an exemplary embodiment of the inventive concept may be completed.

Next, the liquid crystal display according to an exemplary embodiment of the inventive concept will be described with reference to FIG. 18.

Figure 18:
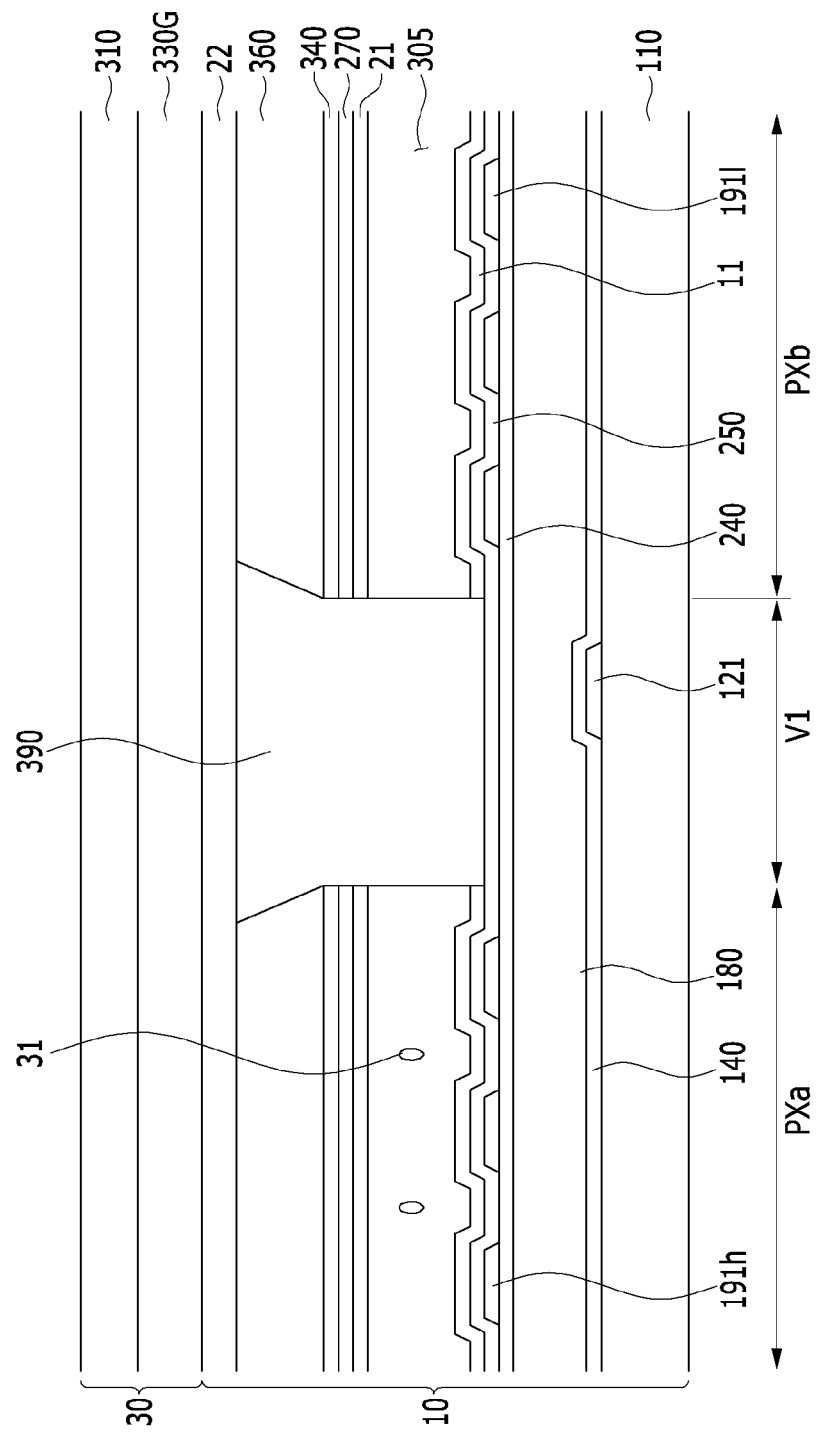
FIG. 18 is a cross-sectional view of a liquid crystal display according to an exemplary embodiment of the inventive concept.

FIG. 18 is a cross-sectional view of a liquid crystal display according to an exemplary embodiment of the inventive concept.

The exemplary embodiment of the inventive concept shown in FIG. 18 is substantially the same as the exemplary embodiment shown in FIG. 2 except for the component of the capping layer 390 and the existence of the first light blocking member 220. Thus, any redundant description is omitted.

The capping layer 390 of the liquid crystal display according to the present exemplary embodiment may further include a light blocking material.

In the present exemplary embodiment, the light blocking material may include a water-soluble black dye or a black pigment. The water-soluble black dye can be dissolved by a capping material that is employed to form the capping layer 390, and the black pigment may be dispersed in the capping material.

The water-soluble black dye of the present exemplary embodiment may include at least one of 2-naphthalenesulfonic acid, trisodium 6-[(7-amino-1-hydroxy-3-sulphonato-2-naphthyl)azo]-3-4-4-amino-6 or 7-sulphonatonaphthyl-azo-phenyl-azo-4-hydroxynaphthalene-2-sulphonate, trisodium 4-amino-3-[[4-[[4-[(2-amino-4-hydroxyphenyl)azo]phenyl]amino]-3-sulphonatophenyl]azo]-5-hydroxy-6-(phenylazo)naphthalene-2,7-disulphonate, and disodium 4-amino-3,6-bis[[4-[(2,4-diaminophenyl)azo]phenyl]azo]-5-hydroxynaphthalene-2,7-disulphonate 2,7-naphthalene-disulfonic acid.

Since the capping layer 390 includes a light blocking material to function as a light blocking member to prevent light leakage, the first light blocking member 220 may be omitted from areas corresponding to the trench V1.

Next, the liquid crystal display according to an exemplary embodiment of the inventive concept will be described with reference to FIG. 19.

Figure 19:
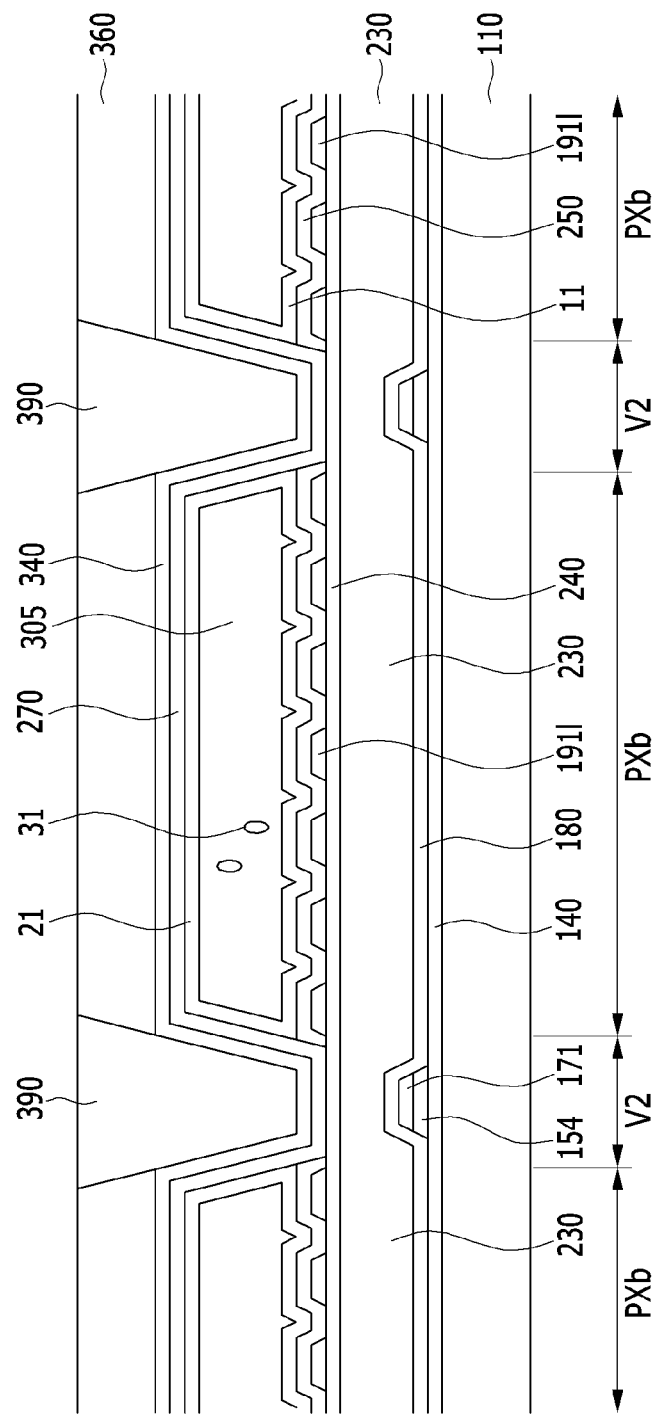
FIG. 19 is a cross-sectional view of a liquid crystal display according to an exemplary embodiment of the inventive concept.

FIG. 19 is a cross-sectional view of a liquid crystal display according to an exemplary embodiment of the inventive concept.

The exemplary embodiment of the inventive concept shown in FIG. 19 is substantially the same as the exemplary embodiment shown in FIG. 18, except that the capping layer 390 includes a light blocking material and fills the partition part V2 instead of the roof layer 360. Thus, any repetitive or duplicate description is omitted.

Referring to FIG. 19, the capping layer 390 including the light blocking material of the liquid crystal display according to an exemplary embodiment of the inventive concept may also be formed at positions corresponding to the partition part V2 as well as the trench V1.

That is, the capping layer 390 of the liquid crystal display according to the present exemplary embodiment is shaped as a mesh so as to be formed in all of the trench V1 and partition part V2, thereby enclosing the edges of the microcavity 305.

Also, the capping layer 390 includes a light blocking material to have the function of a light blocking member to prevent light leakage, thereby omitting the first light blocking member 220 corresponding to the trench V1 region and the partition part V2.

Next, a test result to test an improvement degree of the color mixture of the liquid crystal display according to the present exemplary embodiment will be described.

To measure the color mixture degree as a function of the thickness of the capping layer formed between the roof layer of the display panel and the color conversion panel, the color mixture degree is measured while changing the thickness of the capping layer.

The result according thereto is shown in Table 1.

TABLE 1

| Capping layer + Polarizer | Capping layer | Polarizer | Light blocking member on Capping layer | Color mixture degree |
|---|---|---|---|---|
| 110 μm | 50 μm | 60 μm | Absence | 2.6% |
| 110 μm | 50 μm |  | Presence | 1.2% |
| 75 μm | 15 μm |  | Absence | 1.5% |
| 70 μm | 10 μm |  | Absence | 1.3% |
| 65 μm | 5 μm |  | Absence | 1.2% |

As shown in Table 1, when the thickness of the capping layer is 50 μm, a color mixture of about 2.6% is generated, however the color mixture is improved (reduced) to 1.2% when the thickness of the capping layer is 5 μm.

Also, it may be confirmed that the degree of color mixture when the thickness of the capping layer is 5 μm is similar to the degree of color mixture when a light blocking member is present on the capping layer and the thickness of the capping layer is 50 μm. Accordingly, it may be confirmed that the light blocking member disposed on the capping layer may be omitted by reducing the thickness of the capping layer, thereby simplifying the structure of the liquid crystal display and its manufacturing process.

As described above, a liquid crystal display and a method of its manufacture according to an exemplary embodiment of the inventive concept may improve the color mixture of the color conversion panel and simplify the structure of the display device by minimizing the thickness of the capping layer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Various features of the above described and other embodiments can be mixed and matched in any manner, to produce further embodiments consistent with the invention.

What is claimed is:

1. A liquid crystal display, comprising:
    a substrate;
    a thin film transistor positioned on the substrate;
    a pixel electrode connected to the thin film transistor;
    a roof layer overlapping the pixel electrode;
    a liquid crystal layer positioned between the pixel electrode and the roof layer within a plurality of microcavities;
    a capping layer positioned adjacent to the microcavities; and
    a color conversion panel including a plurality of color conversion media layers on the roof layer and the capping layer, wherein the capping layer is positioned along a trench formed between the microcavities and includes a photosensitive material.

2. The liquid crystal display of claim 1, further comprising: a partition part disposed between adjacent microcavities and crossing the trench, wherein the capping layer is removed from a region corresponding to the plurality of microcavities and the partition part.

3. The liquid crystal display of claim 2, wherein: the capping layer includes a water-soluble polymer material.

4. The liquid crystal display of claim 1, further comprising: a first light blocking member overlapping at least one of the trench and the partition part and positioned on the thin film transistor.

5. The liquid crystal display of claim 1, wherein: the capping layer further includes a light blocking material, and the light blocking material includes a water-soluble black dye or a black pigment.

6. The liquid crystal display of claim 5, wherein: the capping layer is positioned to correspond to the partition part.

7. The liquid crystal display of claim 1, further comprising: a second light blocking member defining the plurality of color conversion media layers.

8. The liquid crystal display of claim 7, wherein: color conversion media layers include at least one of a phosphor and a quantum dot.

9. The liquid crystal display of claim 8, wherein: color conversion media layers include a red color conversion media layer and a green color conversion media layer.

10. The liquid crystal display of claim 9, wherein: color conversion panel includes a transparent layer or a blue color conversion media layer disposed in the same layer as the red color conversion media layer and the green color conversion media layer.

11. The liquid crystal display of claim 10, further comprising: a polarizer formed on the roof layer and the capping layer.

12. A method of manufacturing a liquid crystal display, the method comprising:
   forming a thin film transistor on a substrate;
   forming a pixel electrode on the thin film transistor;
   forming a sacrificial layer on the pixel electrode; forming a roof layer on the sacrificial layer;
   removing the sacrificial layer to form a plurality of microcavities each having an injection hole;
   injecting a liquid crystal material into the microcavities through the injection holes;
   coating a capping material on the substrate to cover the roof layer and the injection holes;
   removing the capping material from the roof layer to form a capping layer disposed along a trench formed between adjacent microcavities; and
   forming a color conversion panel on the capping layer and the roof layer, the color conversion panel including a plurality of color conversion media layers.

13. The method of claim 12, wherein: the capping material includes a water-soluble polymer material and a photosensitive material.

14. The method of claim 13, wherein: the capping layer is formed by disposing a mask on the substrate and using an exposure and developing process.

15. The method of claim 13, wherein: the capping layer is removed from the region corresponding to the plurality of microcavities.

16. The method of claim 13, wherein: the roof layer includes a partition part formed between adjacent microcavities and crossing the trench, and the method further comprises, after forming the thin film transistor, forming a first light blocking member overlapping at least one of the trench and the partition part, and positioned on the thin film transistor.

17. The method of claim 16, wherein: the capping layer is positioned to correspond to the partition part.

18. The method of claim 12, wherein: the capping layer further includes a light blocking material, and the light blocking material includes a water-soluble black dye or a black pigment.

19. The method of claim 13, wherein: the color conversion media layer includes a phosphor or a quantum dot, and the color conversion media layer includes a red color conversion media layer, a green color conversion media layer, and a blue color conversion media layer.

* * * * *